United States Patent
Oboril et al.

(10) Patent No.: US 12,548,448 B2
(45) Date of Patent: Feb. 10, 2026

(54) METHODS AND DEVICES FOR DETERMINING AN ACTION IN THE PRESENCE OF ROAD USERS

(71) Applicant: Intel Corporation, Santa Clara, CA (US)

(72) Inventors: Fabian Oboril, Karlsruhe (DE); Frederik Pasch, Karlsruhe (DE); Cornelius Buerkle, Karlsruhe (DE); Kay-Ulrich Scholl, Malsch (DE); Ignacio J. Alvarez, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 869 days.

(21) Appl. No.: 17/541,309

(22) Filed: Dec. 3, 2021

(65) Prior Publication Data
US 2022/0092987 A1  Mar. 24, 2022

(51) Int. Cl.
G08G 1/16 (2006.01)
B60W 30/095 (2012.01)
B60W 40/06 (2012.01)
B60W 40/09 (2012.01)

(52) U.S. Cl.
CPC ......... *G08G 1/166* (2013.01); *B60W 30/0956* (2013.01); *B60W 40/06* (2013.01); *B60W 40/09* (2013.01)

(58) Field of Classification Search
CPC ............. B60W 30/0956; B60W 40/06; B60W 40/09; B60W 60/0015; B60W 60/0017; B60W 60/0027; B60W 2554/4023; B60W 2554/4029; B60W 2554/4041;
(Continued)

(56) References Cited

U.S. PATENT DOCUMENTS

| 12,228,929 B2* | 2/2025 | Silver .................... G05D 1/81 |
| 2016/0075026 A1* | 3/2016 | Sisbot ................... B25J 9/1676 700/255 |
| 2019/0266895 A1* | 8/2019 | Suzuki ............. G08G 1/096783 |

(Continued)

OTHER PUBLICATIONS

Yoon et al., "Social Force Control for Human-Like Autonomous Driving", International Design Engineering Technical Conferences & Computers and Information in Engineering Conference, IDETC/CIE 2018 Aug. 26-29, 2018, 2018, Quebec City, Quebec, Canada, 8 pages.

(Continued)

*Primary Examiner* — Peter D Nolan
*Assistant Examiner* — Ce Li Li
(74) *Attorney, Agent, or Firm* — VIERING, JENTSCHURA & PARTNER mbB

(57) ABSTRACT

Devices and methods for determining an action in the presence of road users are provided in this disclosure. A device may include a processor. The processor may be configured to access environment information including an indication of a size of road users intersecting with a predetermined route of a vehicle in a road environment. The processor may further be configured to prioritize an anticipated movement of at least one of the road users over a predicted movement of the vehicle within the predetermined route based on the size of road users. The processor may further be configured to determine a vehicle action allowing the anticipated movement of the at least one road user.

18 Claims, 9 Drawing Sheets

(58) Field of Classification Search
CPC .. B60W 2554/4042; B60W 2554/4045; G08G 1/162; G08G 1/166
See application file for complete search history.

(56) References Cited

U.S. PATENT DOCUMENTS

| | | | |
|---|---|---|---|
| 2020/0057443 A1* | 2/2020 | Silver | G05D 1/0088 |
| 2021/0018919 A1* | 1/2021 | Silver | G06V 20/584 |
| 2022/0063621 A1* | 3/2022 | Austin | G06V 20/584 |
| 2022/0340138 A1* | 10/2022 | Seegmiller | B60W 30/045 |
| 2023/0141636 A1* | 5/2023 | Silver | B60W 60/0017 701/23 |
| 2024/0085907 A1* | 3/2024 | Silver | B60W 30/18009 |

OTHER PUBLICATIONS

Eggert et al., "A Foresighted Driver Model derived from Integral Expected Risk", 2019 IEEE Intelligent Transportation Systems Conference (ITSC). IEEE, 2019, 8 pages.

* cited by examiner

METHODS AND DEVICES FOR DETERMINING AN ACTION IN THE PRESENCE OF ROAD USERS

TECHNICAL FIELD

This disclosure generally relates to methods and devices for a vehicle, in particular, for determining an action in the presence of road users.

BACKGROUND

With the development of autonomous driving systems, there are many solutions addressed for road users including vehicles, which are intended to provide guidance to a vehicle within various traffic scenarios in a road environment. Many of these solutions rely on the information with respect to the road environment, that is obtained via various information sources, such as sensors located on the vehicle, and/or that is obtained by communicating with other road users or road-side units located in the road environment.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
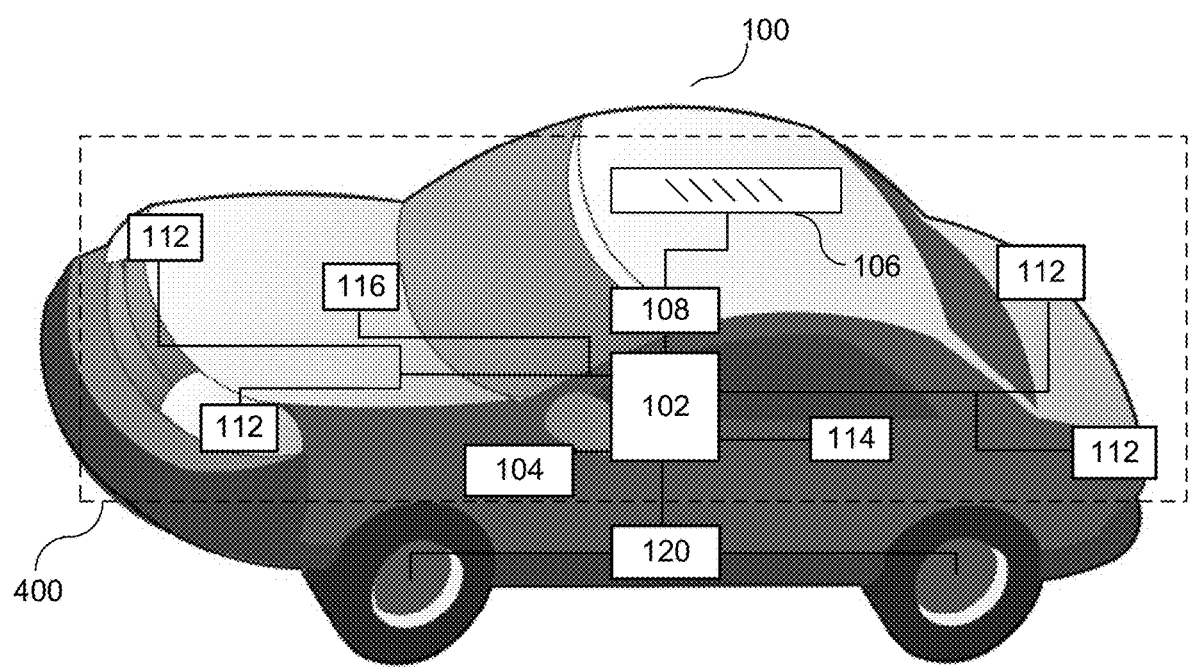
FIG. 1 shows schematically a vehicle including a mobility system and a control system.

The following detailed description refers to the accompanying drawings that show, by way of illustration, exemplary details and aspects in which aspects of the present disclosure may be practiced.

Some traffic scenarios may include vehicles that may not drive as fast as other vehicles due to various reasons, such as technical constraints due to type of vehicles, various speed limits applied for different types of vehicles, malfunction of various driving elements, etc. In such cases, a crowd of road users in a configuration of a line of vehicles may be formed starting from the slow vehicle, especially when there is no available lane for other vehicles to pass the slow vehicle in a safe manner. The line of vehicles may get longer, especially in case the road environment does not provide a possibility for other vehicles to pass the slow vehicle (e.g. narrow roads or roads on which passing a vehicle is prohibited).

Some roads may include special areas called turnout locations or turnouts in which a vehicle may pull to the side to allow the other vehicles (e.g. other vehicles of the line of vehicles behind the vehicle) to pass the vehicle. Some roads may include special areas called passing lanes in which a vehicle may pull and slow down to allow the other vehicles to pass the vehicle. It may be desirable to use such special areas by slow vehicles with an intention to increase the overall efficiency of the road environment for all users and to increase safety, even such maneuver may result in a delay for the slow vehicle.

Furthermore, there may be some traffic scenarios including various types of road users, such as vehicles and vulnerable road users including pedestrians, cyclists, motor-cyclists, and even pets or other animals. A trajectory of a crowd of road users including various types of road users may intersect with the predicted trajectory of the vehicle, and there may be certain cases in which may be desirable for the vehicle to allow the trajectory of the crowd of road users even that may result in a delay for the vehicle.

The following detailed description refers to the accompanying drawings that show, by way of illustration, specific details and aspects in which the disclosure may be practiced.

The term "road user" intends to refer any vehicles involved in road traffic that may include passenger cars, trucks, motorcycles, electrical scooters, electrical chairs, and the like, and further it may include vehicles that are driven with a motor or without a motor, including bicycles, and scooters. Furthermore, the term "road user" also includes vulnerable road users such as pedestrians, cyclists, motor-cyclists, and people with disabilities or reduced mobility and orientation.

The term "vulnerable road user" intends to refer to road users that may be non-motorized road users, such as pedestrians, children, and cyclists as well as motor-cyclists and persons with disabilities or reduced mobility and orientation.

The term "crowd of road users" intends to refer to any group of road users within a certain proximity to each other, that exemplarily may include a line of vehicles, a group of pedestrians, a group of cyclists, etc. The crowd of road users may act as one group having the same objective task (e.g. standing, moving towards a certain location), or may act independently.

The term "size of road users" intends to refer to a magnitude with respect to the size of the road users. The term encompasses a collective size for a crowd of road users (e.g. a sum of sizes of each of the road users in the crowd, or a space occupied by the crowd of road users). The size may be a two-dimensional magnitude (e.g. a line for a line of vehicles), or a three-dimensional magnitude. For example, the size of road users may include a number of road users in a crowd of road users, a length of a line of road users, a length of a line of vehicles, a space occupied by the crowd of road users, etc.

The term "anticipated movement" intends to refer to an expectation of a movement. It may include a conjecture or an assumption of a movement, or a prediction with respect to the movement.

The word "exemplary" is used herein to mean "serving as an example, instance, or illustration". Any aspect or design described herein as "exemplary" is not necessarily to be construed as preferred or advantageous over other aspects or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The disclosure may include information related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above.

For purposes of this disclosure, radio communication technologies may be classified as one of a Short-Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

The terms "radio communication network," "wireless network", "communication network," or the like, as utilized herein encompasses both an access section of a network (e.g., a radio access network (RAN) section) and a core section of a network (e.g., a core network section).

Figure 2:
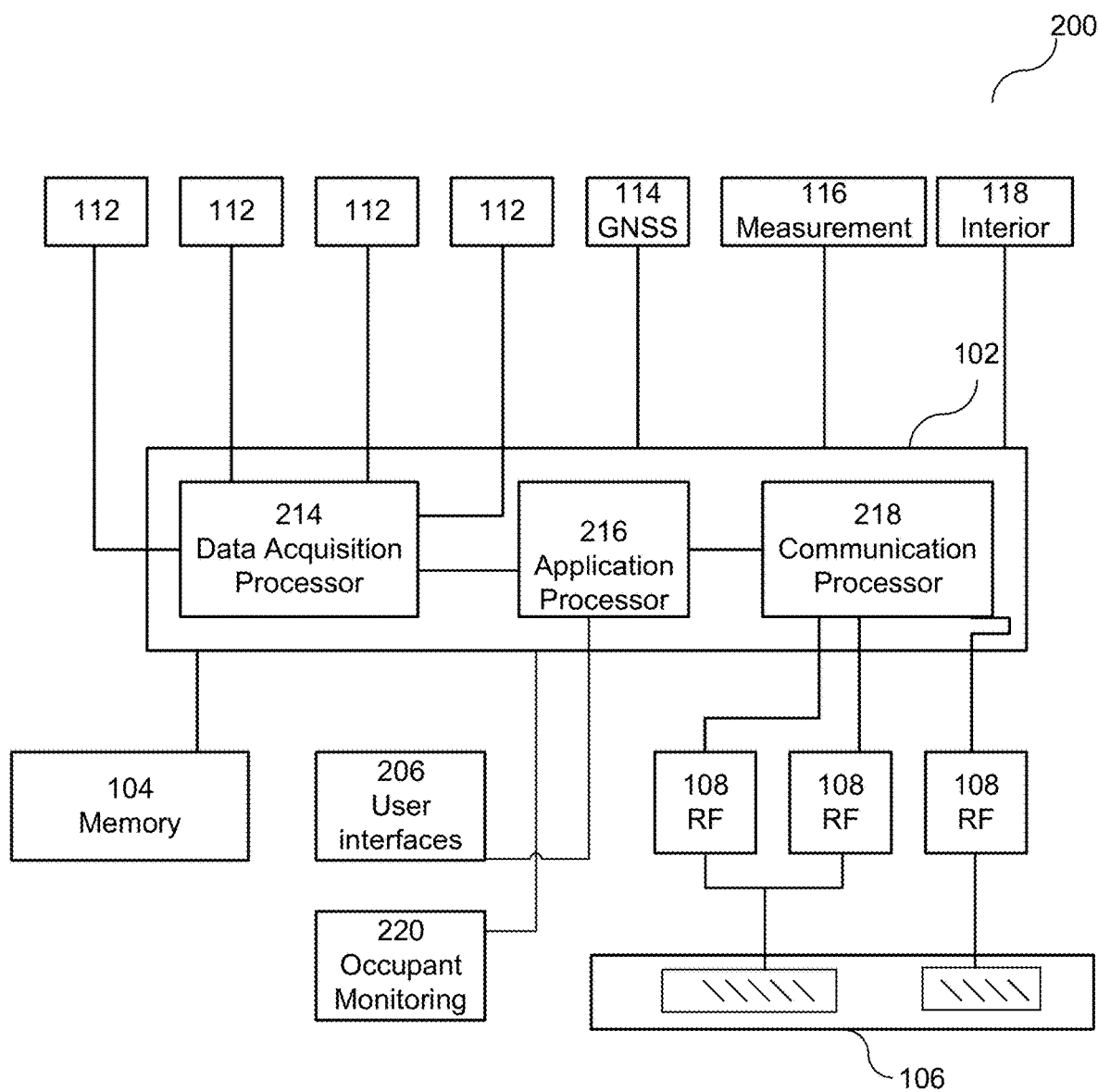
FIG. 2 shows schematically a vehicle including a mobility system and a control system.

FIG. 1 shows a vehicle 100 including a mobility system 120 and a control system 200 (see also FIG. 2). FIG. 1 and FIG. 2 are provided in a complementary manner. It is appreciated that vehicle 100 and control system 200 are exemplary in nature and may thus be simplified for explanatory purposes. For example, while vehicle 100 is depicted as a ground vehicle, this may be equally or analogously applied to aerial vehicles, water vehicles (e.g. sea vehicles, underwater vehicles), and such. Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels.

In addition to including a control system 200, vehicle 100 may also include a mobility system 120. Mobility system 120 may include components of vehicle 100 related to steering and movement of vehicle 100. Where vehicle 100 is an automobile, for example, mobility system 120 may include wheels and axles, a suspension, an engine, a transmission, brakes, a steering wheel, associated electrical circuitry and wiring, and any other components used in the driving of an automobile. Especially certain components of the mobility system 120 may be a source of vibrations that may be transmitted to the occupant due to the nature of steering and movement of the vehicle. Such vibration sources may include wheels and the engine.

Mobility system 120 may also include autonomous driving functionality, and accordingly may include an interface with one or more processors 102 configured to perform autonomous driving computations and decisions and an array of sensors for movement and obstacle sensing. In this sense, the mobility system 120 may be provided with instructions to direct the navigation and/or mobility of vehicle 100 from one or more components of the control system 200. The autonomous driving components of mobility system 120 may also interface with one or more radio frequency (RF) transceivers 108 to facilitate mobility coordination with other nearby vehicular communication devices and/or central networking components, such as a traffic infrastructure system, or a roadside unit, or a monitoring system.

Furthermore, mobility system 120 may include or coupled to sensors (e.g. as data acquisition devices) that are configured to detect acceleration of the components that may be a source of vibrations. In the example of an automobile, a sensor configured to detect acceleration may be coupled to the engine. There may be further sensors configured to detect acceleration that are coupled to at least one wheel of the vehicle. The sensors may be configured to detect acceleration based on movements of the coupled component relative to the housing or chassis of the vehicle. Such sensors may include inertial measurement unit (IMU) sensors.

The control system 200 may include various components depending on the requirements of a particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data acquisition devices 112, one or more position devices 114 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

Furthermore, the control system 200 may include or may be coupled to interior systems 118 related to various cabin features of the vehicle 100. The interior systems 118 may include an in-vehicle infotainment system, occupant monitoring devices 220, seat actuators to change positions, shape or properties of seats, air conditioner systems, etc. The control system 200 may be configured to control the interior systems 118.

The control system 200 may be configured to control the vehicle's 100 mobility via mobility system 120 and/or interactions with its environment, e.g. communications with other devices or network infrastructure elements (NIEs) such as base stations, via data acquisition devices 112 and the radio frequency communication arrangement including the one or more RF transceivers 108 and antenna system 106.

The one or more processors 102 may include a data acquisition processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a CPU, support circuits, digital signal processors, integrated circuits, memory, or any other types of devices suitable for running applications and for image processing and analysis. Each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data acquisition processor 214 may include processing circuitry, such as a CPU, for processing data acquired by data acquisition units 112. For example, if one or more data acquisition units are image acquisition units including sensors e.g. one or more cameras, then the data acquisition processor may include image processors for processing image data using the information obtained from the image acquisition units as an input. The data acquisition processor 214 may therefore be configured to create voxel maps detailing the surrounding of the vehicle 100 based on the data input from the data acquisition units 112, i.e., cameras in this example. For example, the one or more data acquisition units may include sensors, and the data acquisition processor 214 may receive information from the sensors and provide sensor data to the application processor. The sensor data may include information indicating the detections performed by the sensors.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UI) 206 for supporting user interaction with vehicle 100, and/or various user applications. Application processor 216 may interface with communication processor 218 and act as a source (in the transmit path) and a sink (in the receive path) for user data, such as voice data, audio/video/image data, messaging data, application data, basic Internet/web access data, etc. Application processor 216 may interface with the data acquisition processor 214 to receive sensor data.

In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver 108. RF transceiver 108 may then process the digital baseband samples to convert the digital baseband samples to analog RF signals, which RF transceiver 108 may wirelessly transmit via antenna system 106.

In the receive path, RF transceiver 108 may receive analog RF signals from antenna system 106 and process the analog RF signals to obtain digital baseband samples. RF transceiver 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via a user interface 206. User interfaces 206 may include one or more screens, microphones, mice, touchpads, keyboards, or any other interface providing a mechanism for user input.

Vehicle 100 may transmit and receive wireless signals with antenna system 106, which may be a single antenna or an antenna array that includes multiple antenna elements. Antenna system 202 may additionally include analog antenna combination and/or beamforming circuitry. In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. Communication processor 218 may control the radio transmission and reception of RF transceiver(s) 108, including specifying the transmit and receive radio frequencies for operation of RF transceiver(s) 108.

Communication processor 218 may include a baseband modem configured to perform physical layer (PHY, Layer 1) transmission and reception processing to, in the transmit path, prepare outgoing transmit data provided by communication processor 218 for transmission via RF transceiver(s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding, and interleaving, channel modulation/demodulation, physical channel mapping, radio measurement and search, frequency and time synchronization, antenna diversity processing, power control, and weighting, rate matching/de-matching, retransmission processing, interference cancelation, and any other physical layer processing functions.

RF transceiver(s) 108 may include separate RF circuitry sections dedicated to different respective radio communication technologies, and/or RF circuitry sections shared between multiple radio communication technologies. Antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

V2X messages shared using V2X protocols may include various data items that may be in a form of data elements or data frames indicating information including any type of traffic related information (e.g. traffic data) under various categories. Such categories may include vehicle information indicating a feature of a vehicle such as driving direction, information relating acceleration/deacceleration of a vehicle etc., georeference information indicating a geographical description e.g. altitude, longitude, latitude related information, road topology information indicating information related to road topology such as road segment type, environment information indicating traffic related information such as a presence of accident, presence of dangerous situation, infrastructure information indicating information about the infrastructure, such as a presence of a toll or a road side unit, personal information indicating a personal information, communication information that are related to the application layer of the communication protocol, such as an identifier of a station exchanging information, and other information such as type of a station which exchanges information.

Memory 104 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. Each of the one or more antennas of antenna system 106 may be placed at a plurality of locations on the vehicle 100 in order to ensure maximum RF coverage. The antennas may include a phased antenna array, a switch-beam antenna array with multiple antenna elements, etc. Antenna system 106 may be configured to operate according to analog and/or digital beamforming schemes in order to maximize signal gains and/or provide levels of information privacy. Antenna system 106 may include separate antennas dedicated to different respective radio communication technologies, and/or antennas shared between multiple radio communication technologies.

While shown as a single element in FIG. 1, antenna system 106 may include a plurality of antenna elements (e.g., multiple antenna arrays) positioned at different locations on vehicle 100. The placement of the plurality of antenna elements may be strategically chosen in order to ensure a desired degree of RF coverage. For example, additional antennas may be placed at the front, back, corner(s), and/or on the side(s) of the vehicle 100.

Data acquisition devices 112 may include any number of data acquisition devices and components, including sensors, depending on the requirements of a particular application. This may include image acquisition devices, proximity detectors, acoustic sensors, pressure sensors, fingerprint sensors, motion detectors, etc., for providing data about the interior of the vehicle or the vehicle's environment. Image acquisition devices may include cameras (e.g., multimodal cameras, standard cameras, digital cameras, video cameras, single-lens reflex cameras, infrared cameras, stereo cameras, depth cameras, RGB cameras, depth cameras, etc.), charge coupling devices (CCDs), or any type of image sensor. Proximity detectors may include radar sensors, light detection and ranging (LIDAR) sensors, mmWave radar sensors, etc. Acoustic sensors may include microphones, sonar sensors, ultrasonic sensors, etc. Furthermore, the data acquisition devices may include the sensors coupled to the mobility system 120, such as the accelerometers, inertial measurement unit (IMU) sensors coupled to vibration sources of the vehicle.

The data acquisition devices 112 may be configured depending on the requirements of a particular application. This may include: image acquisition devices configured to detect other vehicles or objects in the road environment, image acquisition devices configured to detect predefined areas such turnout locations, passing lanes, areas that the vehicle 100 may stop or slow down in the road environment, image acquisition devices configured to detect other vehicles behind the vehicle 100 or ahead of the vehicle 100, etc.

Accordingly, each of the data acquisition units may be configured to observe a particular type of data of the vehicle's 100 environment and forward the data (e.g. sensor data) to the data acquisition processor 214 in order to provide the vehicle with an accurate portrayal of the vehicle's 100 environment. The data acquisition devices 112 may be configured to implement pre-processed sensor data, such as radar target lists or LIDAR target lists, in conjunction with acquired data.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, etc. It is appreciated that vehicle 100 may have different measurement devices 116 depending on the type of vehicle it is, e.g., car vs. drone vs. boat.

Position devices 114 may include components for determining a position of the vehicle 100. For example, this may include GPS or other GNSS circuitry configured to receive signals from a satellite system and determine a position of the vehicle 100. Position devices 114, accordingly, may provide vehicle 100 with satellite navigation features. The one or more position devices 114 may include components (e.g., hardware and/or software) for determining the position of vehicle 100 by other means, e.g. by using triangulation and/or proximity to other devices such as NIEs.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (sensor data including information such as images, sensor readings, radar signals, depth information from LIDAR, or stereo processing of two or more images) of the environment of the vehicle 100 together with position information, such as GPS coordinates, a vehicle's ego-motion, etc., to determine a current location of the vehicle 100 relative to the known landmarks, and refine the determination of the vehicle's location. Certain aspects of this technology may be included in a localization technology such as a mapping and routing model.

Furthermore, the one or more memories 104 may store data, e.g., in a database or in any different format, including occupant information 204 that may correspond to information related to one or more occupants. The data may include information related to the identification of one or more occupants. The data may include face recognition data, fingerprint data, body data/body posture data, behavior data, hand position data, hand posture data, hand gesture data, movement data, action data. The data may further include one or more parameters or settings that are predefined and/or predetermined for one or more occupants, in order to adjust one or more settings related to the vehicle 100.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model such as a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an engine control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to perform as described herein. In various examples, the one or more processors 102 of the vehicle or the control system 200 is configured to include the devices that determine a vehicle action based on a presence of road users as disclosed herein.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure. Furthermore, the control system 200 may further include a device 220 for monitoring an occupant in accordance with this disclosure. The control system 200 may further include a device 222 for controlling an active seat in accordance with this disclosure.

In a road environment, it may be desirable for a vehicle 100 to communicate with other entities in order to enhance the road safety and provide more efficient traffic situation within the road environment. Developing communication protocols, such as V2V (vehicle-to-vehicle) in which a vehicle communicates with another vehicle, V2I (vehicle-to-infrastructure), in which a vehicle communicates with an infrastructure item, such as a traffic infrastructure system or a roadside unit, V2N (vehicle-to-network) in which a vehicle communicates with a network function, V2P (vehicle-to-pedestrian) in which a vehicle communicates with a pedestrian are adopted for this purpose, which are combined together as V2X (vehicle-to-everything). Some of these protocols rely on vehicles broadcasting messages to communicate with other entities in a predefined proximity (e.g. V2V), while others rely on a communication through an established network (e.g. V2N).

V2X messages shared using V2X protocols may include various data items that may be in a form of data elements or data frames indicating information including any type of traffic related information (e.g. environment information) under various categories. Such categories may include vehicle information indicating a feature of a vehicle such as driving direction, information relating acceleration/deacceleration of a vehicle etc., georeference information indicating a geographical description e.g. altitude, longitude, latitude related information, road topology information indicating information related to road topology such as road segment type, environment information indicating traffic related information such as a presence of accident, presence of dangerous situation, infrastructure information indicating information about the infrastructure, such as a presence of a toll or a road side unit, personal information indicating a personal information, communication information that are related to the application layer of the communication protocol, such as an identifier of a station exchanging information, and other information such as type of a station which exchanges information.

Accordingly, the vehicle 100 may generate information based on the vehicle 100, and the vehicle 100 may encode V2X messages for transmission. V2X messages may include information indicating an observation that the vehicle 100 performs using data acquisition devices 112. For example, V2X messages may include information indicating a list of objects that the vehicle 100 has detected in its vicinity using data acquisition devices 112. The vehicle 100 may transmit the list of objects for other vehicles to make other vehicles aware of the objects that the vehicle 100 has detected using data acquisition devices 112.

Figure 3A:
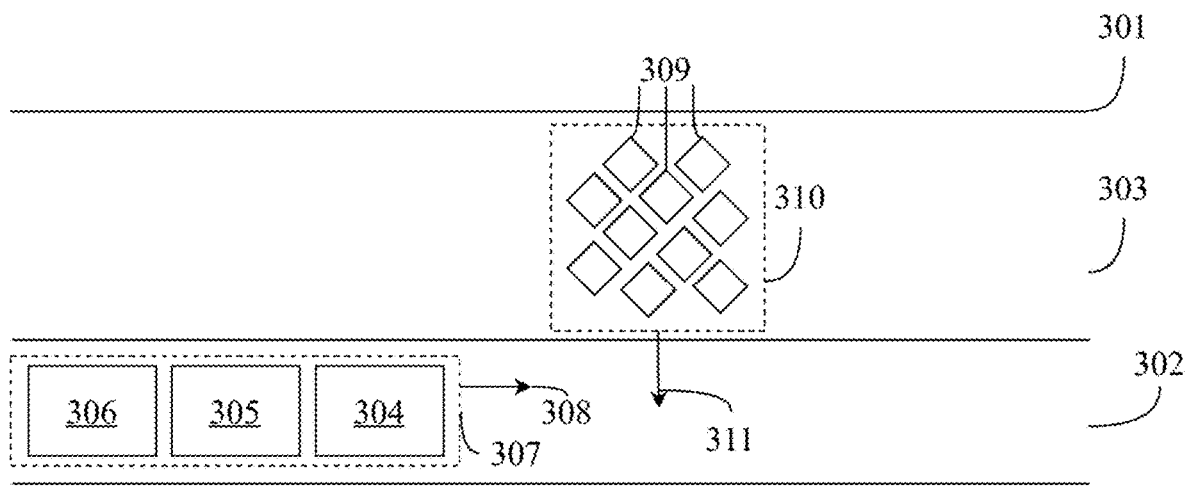
FIG. 3A shows an illustration of a road environment.

FIG. 3A shows an illustration of a road environment. The road environment 301 includes a driving lane 302 that is depicted as allowing a vehicle traffic flow, and a pedestrian zone 303. A leading vehicle 304 may follow its predetermined route to reach a target location in the corresponding driving lane 302, and trailing vehicles 305, 306 may have to follow the leading vehicle 304 as they intersect with the followed route of the leading vehicle 304 going slow, forming a crowd of road users, or in other words, since the road users are all vehicles, a line of vehicles 307 going towards to a right-hand direction 308. The trailing vehicles 305, 306 have to adjust their speed according to the speed of the leading vehicle 304, and it may be anticipated by the speed of the leading vehicle 304 that the trailing vehicles 305 may want to pass the leading vehicle 304.

Furthermore, there are other road users in the road environment 301. It is exemplarily depicted that there is a plurality of vulnerable road users 309, such as pedestrians, at the pedestrian zone 303 forming another crowd of road users 310. The vulnerable road users 309 that the another crowd of road users 310 includes may all face towards the driving lane 302. Accordingly, an anticipated movement of the another crowd of road users 310 may include a further movement intersecting with the predicted route of the leading vehicle 304, and also with the anticipated route of the line of vehicles 307.

In a social force based models, the interactions between road users may be analyzed with pull forces or push forces referring to psychological pressure considered to be formed with the interaction. In this illustrative example, for the leading vehicle 304, a target location of the leading vehicle 304 based on its predetermined route may form a pull force for the leading vehicle 304 indicating that the target location pulls the leading vehicle to itself. Furthermore, the trailing vehicles 305, 306 may form push forces for the leading vehicle 304 as they are anticipated to pass the leading vehicle 304 (i.e. the leading vehicle is the slow vehicle). Furthermore, the vulnerable road users 309 forming the another crowd of road users 310 may also form push forces for the leading vehicle 304, as they are anticipated to intersect with the anticipated route of the leading vehicle 304.

Figure 3B:
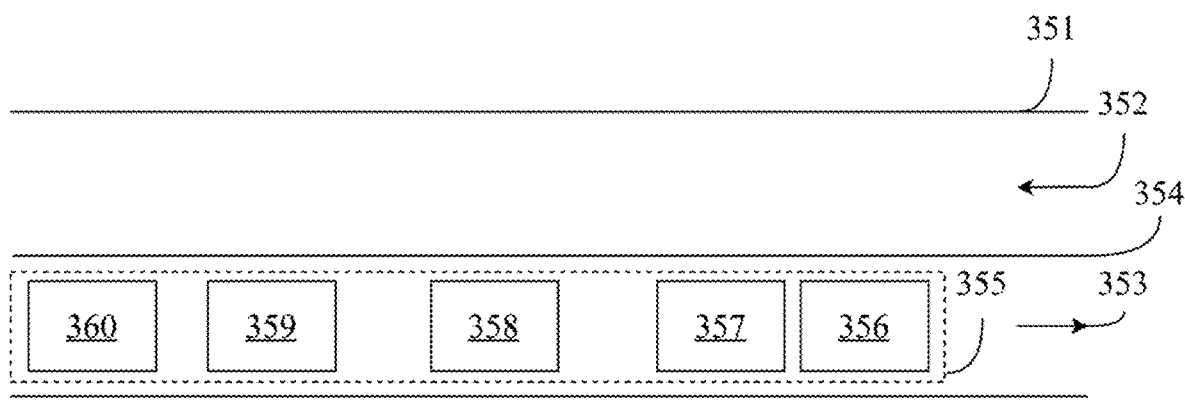
FIG. 3B shows an illustration of a road environment.

FIG. 3B shows an illustration of another road environment. The road environment 351 includes a driving lane 352 that is depicted as allowing traffic flow towards the left-hand side and another driving lane 353 that is depicted as allowing traffic flow towards the right-hand side, which are separated by a road marking 354 indicating that passing a vehicle is prohibited. A leading vehicle 356 may follow its predetermined route to reach a target location in the corresponding driving lane 353, and trailing vehicles 357, 358, 359, 310 may have to follow the leading vehicle 356 as they intersect with the followed route of the leading vehicle 356 going slow, forming a crowd of road users to be referred as a line of vehicles 355. The trailing vehicles 357, 358, 359, 360 have to adjust their speed according to the speed of the leading vehicle 356. Accordingly, a predicted movement for the leading vehicle 356 may include to continue its journey by going slow.

The line of vehicles 355 includes a plurality of vehicles including the leading vehicle 356 and the trailing vehicles 357, 358, 359, 310 that are traveling ahead and may move at approximately the same speed. Each vehicle may leave a certain distance to a vehicle ahead at his consideration. Each vehicle may exhibit various behaviors within the line of vehicles 355. Some vehicles may exhibit smooth and or slow movements within the line of vehicles 355, and some vehicles may exhibit relatively abrupt movements indicating, for example, an impatient driver eager to get out of the line of vehicles 355 and continue their journey at a speed that they desire. Some vehicles may even perform prohibited, and/or dangerous maneuvers to pass the leading vehicle 356 and get out of the line of vehicles 355.

The plurality of vehicles may include any type of vehicles, such as cars, motorcycles, bicycles, trucks, buses, wagons, trailers, construction vehicles, agriculture vehicles, etc. The vehicles may include autonomous vehicles including any type of vehicles having various levels of automation (e.g. various levels of SAE classification) or non-autonomous vehicles.

Figure 4:
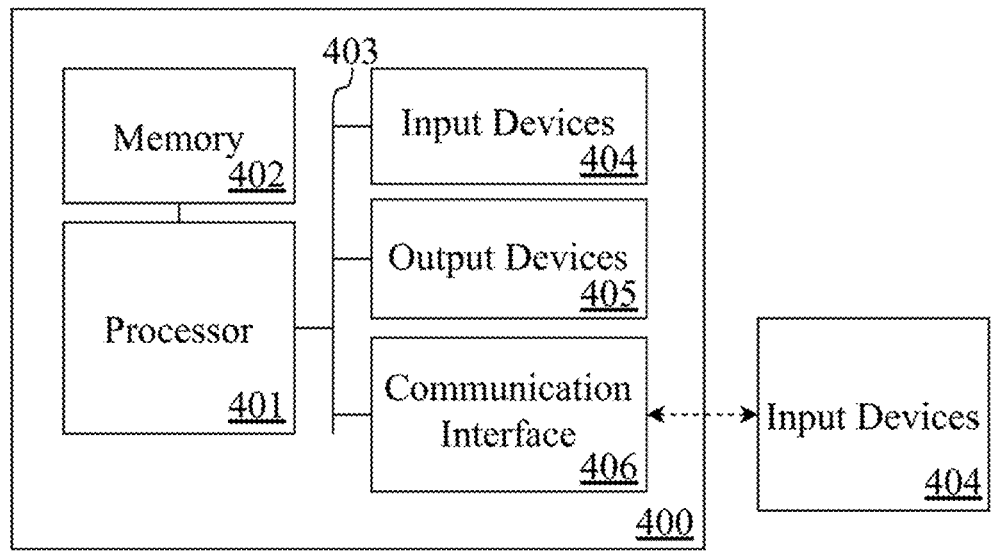
FIG. 4 shows schematically an example of a device for assisting to a vehicle.

FIG. 4 shows schematically an example of a device for assisting to a vehicle. A vehicle or an automated vehicle system may include the device 400 with the input and output devices, and also other entities provided in this disclosure. A user device, or alternatively a road-side unit or a traffic infrastructure unit may also include the device 400 performing operations for a particular vehicle in the road environment. The vehicle may be the vehicle and the control system according to FIG. 1 and FIG. 2 that may include the device 400. For example, the control system of the vehicle as provided according to FIG. 1 and FIG. 2 may include the device 400.

The device 400 includes a processor 401. The processor 401 may be configured to access environment information. The processor 401 may be configured to receive the environment information as an input. Furthermore, the processor 401 may be configured to determine whether the vehicle should prioritize an anticipated movement of another road user (e.g. a road user in a crowd of road users, a vehicle in a line of vehicles,) over a predicted movement of the vehicle within a predetermined route of the vehicle based on the environment information. The anticipated movement of another road user may include a movement that the processor 401 may anticipate or predict for the another road user. The processor 401 may perform various calculations to make the determination of prioritization. Furthermore, the processor 401 may determine a vehicle action in order to allow the anticipated movement of the another vehicle based on a determination of prioritization.

The device 400 may further include a memory 402. The memory 402 may store the environment information. The memory 402 may further store information related to a predetermined route of the vehicle. The device 400 may include an interface 403 coupled to the processor 401. The processor 401 may access the environment information via the interface 403. The device 400 may include one or more input devices 404 that are configured to provide input to the device 400. The device may include a communication interface 406, and the interface 403 may be communicatively coupled to the input devices 404 via the communication interface 406. An input device 404 may store the environment information, and the processor 401 may access the environment information that is stored on the input device 404.

The input devices 404 may include one or more sensors, other data acquisition units, measurement devices, position devices, storage units, advanced driving assistance systems, or other devices that are configured to provide input to the device 400. These devices may be configured to provide environmental data including information indicating a feature related to the environment of the vehicle. For example, the input devices 404 may include interior systems 118, and/or data acquisition units 112, and/or measurement devices, position devices 114, memory 104 of the vehicle as discussed with respect to FIG. 1 and FIG. 2.

The input devices 404 may include image acquisition devices, motion detectors, multimodal sensors, etc., for providing data (e.g. sensor data) that relates to the road environment. Image acquisition devices may include cameras (e.g., multimodal cameras, standard cameras, digital cameras, video cameras, single-lens reflex cameras, infrared cameras, stereo cameras, depth cameras, RGB cameras, depth cameras, etc.), charge coupling devices (CCDs), or any type of image sensors. The image acquisition devices may provide images related to multiple modalities (e.g. infra-red imaging, depth imaging, thermal imaging, etc.). Furthermore, the data may include color information (e.g. RGB, CMYK). Furthermore, the input devices 404 may include a high-resolution radar, and/or light detection and ranging radar (LIDAR) sensors configured to provide visual information (e.g. depth information, image) related to the occupant. Such applications may be implemented with a desire to obtain more robust detection based on lighting conditions.

The input devices 404 may also include devices (e.g. communication devices) of other vehicles in the environment providing the data (e.g. traffic data) that relates to the road environment including data that relates to the other vehicles. The input devices 404 may further include road-side units, traffic infrastructure units, or any type of other devices that may provide the data that relates to the road environment, such as communication devices of navigation services or systems.

The processor 401 may be configured to receive the data that relates to the road environment from the input devices 404. The interface 403 may receive the data from one or more of the input devices 404, and provide the data to the processor 401. The interface 403 may receive the data from one or more of the input devices 404 and the memory 402 may store the data. Furthermore, a user device of an occupant of the vehicle, or of a pedestrian in the road environment may be communicatively coupled to the device 400 as an input device via the communication interface 406, and the user device may provide the data.

The interface 403 may be coupled to the input devices 404 via any communication means. The interface 403 may be coupled to the input devices 404 electrically (e.g. via a wired connection) to receive data that the input devices 404 provide. The communication interface 406 may manage the communication with the input devices 404. The communication interface 406 may be communicatively coupled to the input devices 404 (via wired or radio communication), and the communication interface 406 may provide the data received from the input devices 404 to the interface 403. The communication interface 406 may receive the data over a communication network or via peer-to-peer communication (e.g. ad-hoc) from the input devices 404. Furthermore, the device 400 may be communicatively coupled to other systems or components of the vehicle (e.g. autonomous vehicle system, electronic control unit, etc.) via the communication interface 406 to receive data.

The processor 401 may receive the data from the input devices and generate or form the environment information in the memory 402 based on the received data (e.g. traffic data, sensor data). The environment information may include any type of information that may relate to the road environment. For example, the environment information may include traffic related information as provided in this disclosure, road user types of road users, vehicle types of vehicles, speed of vehicles, predicted intent of vehicles, position of vehicles, detected road users (e.g. detected road users in the crowd of road users), an amount of road users (e.g. an amount of the crowd of road users), size of road users (e.g. a size for the crowd of road users), a number of road users (e.g. a number of road users in the crowd of road users), an indication of a space occupied by road users (e.g. by the crowd of road users), a length of road users (e.g. a length of a detected line of vehicles behind the vehicle), a length of road users (e.g. a length of a line of vehicles detected ahead of the vehicle), a speed (e.g. maximum allowed speed, average speed, etc.) related to the road environment, durations for vehicles to stay behind the vehicle, durations for vehicles to stay ahead of the vehicle, predicted behaviors for road users, a map data including the road environment, information related to plurality of other objects including vulnerable road users, such as pedestrians or cyclists, within the road environment, types of objects, speed of objects, average distances between the vehicle other vehicles, shape of the road environment, turnout locations, stop locations, safe stop locations, passing lanes, or indication of anticipated movements.

The processor 401 may perform various methods on the received data (e.g. sensor data or traffic data) to obtain the environment information. Exemplarily, the processor 401 may perform image processing methods on received sensor data including images (e.g. a video image from a camera) in order to obtain a portion of the environment information. For example, the processor 401 may receive the images and perform estimations to detect other road users in the images based on various image processing methods. Based on the detected road users, the processor 401 may further identify road users intersecting with the route of the vehicle, such as a line of vehicles, a group of road users (e.g. vulnerable road users) estimated in a predefined proximity of the vehicle, ahead of the vehicle, or behind the vehicle. The processor 401 may further estimate a size of the road users. The processor 401 may estimate the size of the road users based on a number of detected road users in the crowd of road users, or based on a detection of a space that the crowd of road users occupies.

Furthermore, the processor may receive the images and perform estimations to detect vehicles in the images based on image processing methods. Based on the detected vehicles, the processor 401 may further identify a line of vehicles intersecting with the route of the vehicle, such as a line of vehicles estimated ahead of the vehicle, or line of vehicles estimated in front of the vehicle. The processor 401 may further estimate a length for the identified line of vehicles based on the images. The estimation of the size may have various preciseness levels. The estimation may include approximations for the size of the road users, such as zero, one, and more than one. Accordingly, the processor 401 may obtain a portion of the environment information based on processing the received data.

Furthermore, the device 400 may be coupled to the control system of the vehicle, and the processor 401 may further receive sensor data or traffic data from the vehicle itself. Furthermore, the processor 401 may receive traffic data including a portion of the environment information from a plurality of input devices 404. For example, the processor 401 may receive V2X messages from other vehicles or devices (e.g. user devices of vulnerable users, road-side units, etc.), including information of traffic data as provided in this disclosure, which may provide various information including object types, object locations, the intent of objects, their movements, etc. For example, based on the received traffic data, the processor 401 may identify road users (e.g. a crowd of road users) intersecting with the route of the vehicle, such as a line of vehicles estimated ahead of the vehicle, or a line of vehicles estimated in front of the vehicle, a group of road users in a predefined proximity to the vehicle according to the location information provided by other vehicles, and the location of the vehicle.

Furthermore, the processor 401 may receive traffic data including a portion of the environment information via the communication interface over a communication network. For example, the processor 401 may receive further data that a navigation service may provide, and the provided data may include a map data including information indicating the terrain related to the road environment for at least the route of the vehicle. The map data may include information for the predetermined route, including the shape of the road, possible stop or turnout locations, passing lanes, etc. The processor 401 may receive such further data from the memory 402. Furthermore, the processor 401 may combine the received data from various sources as provided in this disclosure to obtain the environment information. The processor 401 may obtain the data from various sources as indicated above, and perform data fusion techniques.

Furthermore, the processor 401 may perform various predictions for the objects included in the road environment based on the received sensor data and traffic data. The processor 401 may predict behaviors for the vehicles and vulnerable road users based on the traffic data. The processor 401 may predict movements (e.g. trajectories, future positions, future maneuvers, etc.) for the vehicles and vulnerable road users. Accordingly, the environment information may include information indicating such predictions. For example, the processor 401 may predict that a trailing vehicle that travels behind a leading vehicle going slower than a speed of the environment is predicted to pass the leading vehicle at a first opportunity. The predicted movements may include predictions of the intentions of the vehicles. In various examples, a V2X message may include an intention of a vehicle, and the processor 401 may perform the prediction based on the intention of the vehicle.

The device 400 may further include one or more output devices 405 to provide an output. Alternatively, or additionally, the interface 403 may be communicatively coupled to the output devices 405. The interface 403 may be coupled to the output devices 405 via any communication means. The interface 403 may be coupled to the output devices 405 electrically (e.g. via a wired connection) to provide an output. The communication interface 406 may also manage the communication with the output devices 405. The communication interface 406 may be communicatively coupled to the output devices 405 (via wired or radio communication), and the processor 401 may provide an output to the interface 403. The communication interface 406 may receive the output and provide the output to the output devices 405. The communication interface 406 may provide the output over a communication network.

The output devices 405 may include the control system of the vehicle or components coupled to the control system of the vehicle. The device 400 may be communicatively coupled to the control system of the vehicle in order to provide a control signal based on the action that the processor 401 may determine. The device 400 may be a part of the control system of the vehicle, and output devices may include a processor (e.g. application processor) of the control system. The output devices 405 may further include indicators or any type of devices that may provide an indication such as visual indication (e.g. a display), audio indication (e.g. a loudspeaker), etc.

Figure 5:
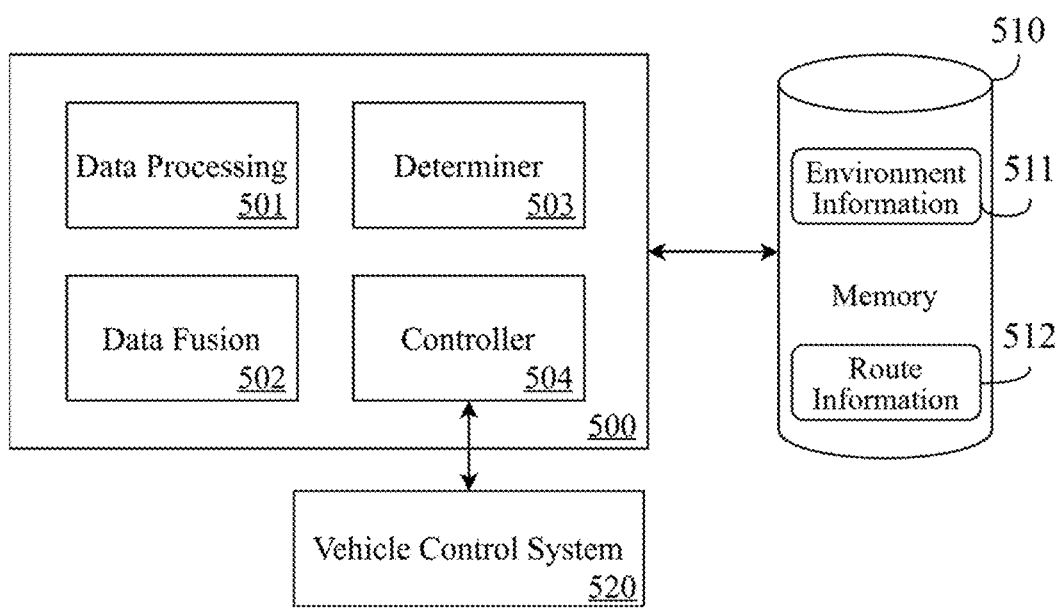
FIG. 5 shows schematically an example illustrating various processing modules of a processor coupled to a memory and a vehicle control system.

FIG. 5 shows schematically an example illustrating various processing modules of a processor coupled to a memory and a vehicle control system. The processor 500 may be the processor of the device provided with respect to FIG. 4. The modules are depicted to introduce various functions of the processor 500. The processor 500 may include a data processing module 501, a data fusion module, a determiner 503, and a controller 504. The processor 500 may be communicatively coupled to the memory 510. The processor 500 may further be communicatively coupled to the vehicle control system 520 configured to control the mobility system of a vehicle. In various examples, a vehicle control system may include the device provided with respect to FIG. 4 and also the processor 500 and the memory 510. For this illustrative example, an autonomous vehicle includes the processor 500 and the device including the processor 500, and the vehicle control system of the autonomous vehicle is coupled to the processor 500. The autonomous vehicle including the processor 500 is referred to as ego-vehicle for this illustrative example.

The data processing module 501 may be configured to receive data, including sensor data and the traffic data, and perform various processing methods in order to extract the information to be used to obtain at least a portion of the environment information based on the received data (e.g. sensor data, traffic data), as indicated with respect to FIG. 4. As the processor 500 may be configured to receive data from input devices continuously, the data processing module 501 may process the received data from input devices to update the extracted information, and the data processing module 501 may provide its output including the information used to obtain various portions of the environment information to the data fusion module 502.

The data fusion module 502 may combine the data received from the data processing module 501 to obtain the environment information. The data fusion module 502 may synchronize the information which input devices may provide. Furthermore, the received traffic data and the received sensor data may include various types of information for the same object, and the data fusion module 502 may combine various types of information to obtain a portion of the environment information for that particular object. The data fusion module 502 may continuously update the environment information 511 that is stored in the memory 510. The memory 510 may further include route information 512 including information about the predetermined route of the ego-vehicle, such as a target location, the route (i.e. locations) that the vehicle is predicted to travel to reach the target location, the current location of the ego-vehicle, etc. The route information 512 may further include the shape of the road environment, turnout locations, stop locations, safe stop locations, passing lanes as well for the predetermined route of the ego-vehicle.

The environment information 511 stored in the memory 510 may include traffic related information as provided in this disclosure, road user types of road users, vehicle types of vehicles, speed of vehicles, predicted intent of vehicles, position of vehicles, detected road users (e.g. road users of a crowd of road users), an amount or a size of road users (e.g. an amount or a size of a crowd of road users), a number of road users, a number of road users in the crowd of road users, an indication of a space occupied by road users (e.g. by the crowd of road users), a length of detected line of vehicles behind the vehicle, a length of line of vehicles detected ahead of the vehicle, a speed (e.g. maximum allowed speed, average speed, etc.) related to the road environment, durations for vehicles to stay behind the vehicle, durations for vehicles to stay ahead of the vehicle, predicted behaviors for vehicles, a map data including the road environment, information related to plurality of other objects including vulnerable road users, such as pedestrians or cyclists, within the road environment, types of objects, speed of objects, average distances between the vehicle other vehicles, shape of the road environment, turnout locations, stop locations, safe stop locations, passing lanes, or indication of anticipated movements. The environment information 511 may include information for the vehicles that may include the ego-vehicle or other vehicles in the road environment. The road users for this illustrative example may include, in particular, road users of a crowd of road users.

The determiner 503 may provide various functions to determine whether the vehicle prioritizes an anticipated movement of at least one road user in the road environment over the predicted movement of the ego-vehicle based on the environment information 511. For example, the determiner 503 may determine to prioritize the anticipated movement of the at least one road user with an intention to increase the efficiency of the road environment as exemplary provided in this disclosure. The determiner 503 may identify that the ego-vehicle is a leading vehicle of detected road users (e.g. a line of vehicles) based on the environment information 511, and the determiner 503 may determine to prioritize the anticipated movement of the road users over the predicted movement of the ego-vehicle. The determiner 503 may further identify that the ego-vehicle is a predefined proximity of detected road users (e.g. vulnerable road users). The determiner 503 may determine to prioritize the predicted movement of other road users based on the size of the road users of which the ego-vehicle is the leading vehicle or of which the ego-vehicle is within the predefined proximity.

The determiner 503 may estimate a cost value for the road users based on the environment information 511 and the route information 512 stored in the memory. The determiner 503 may determine to prioritize the predicted movement of the road users over the predicted movement of the ego-vehicle based on the estimated cost value. The determiner 503 may determine to prioritize the predicted movement of the road users, in case the estimated cost value for the road users is above a predetermined threshold. The determiner 503 may further determine the threshold based on the environment information 511. There are various methods used to model the navigation behavior of objects including vehicles and other road users including vulnerable road users in a road environment. The determiner 503 may employ any one of these methods to determine various aspects of the road environment. For example, the determiner 503 may employ a social force model, and model the road environment and navigation behavior of objects within the road environment based on pull forces and push forces between objects (road users or any other objects) according to the similarities of maneuver planning of humans by considering psychological pressure based on surrounding objects.

The determiner 503 may determine to prioritize the anticipated movement of the road users over the predicted movement of the ego-vehicle by calculating the push forces and/or pull forces between the road users and the ego-vehicle. For example, the environment information 511 may indicate that the ego-vehicle is the leading vehicle of the road users, and the determiner 503 may calculate the push/ pull forces between the road users that travel behind the ego-vehicle and the ego-vehicle. The environment information 511 may indicate that there is a line of vehicles ahead of the ego-vehicle, and the determiner 503 may calculate the push/pull forces between the line of vehicles that is ahead of the vehicle and the ego-vehicle. The environment information 511 may indicate that the ego-vehicle is the leading vehicle of the road users (e.g. the line of vehicles). The road environment also includes further road users (e.g. another crowd of road users) ahead of the ego-vehicle, and the determiner 503 may calculate push/pull forces between both crowds of road users and the ego-vehicle. The determiner 503 may estimate a cost value according to a cost function in order to calculate push/pull forces in between.

The determiner 503 may estimate the cost value based on the size of the road users according to the environment information 511. The determiner 503 may estimate the cost value based on a calculation with a predefined cost function including at least one parameter based on the size of the road users. Furthermore, the cost function may include at least one parameter based on at least one of the following: a size of the road users behind the ego-vehicle, a size of the road users ahead of the ego-vehicle, a speed of the ego-vehicle, a speed related to the road environment, a duration for at least one road user to stay behind the ego-vehicle, a duration for at least one road user to stay ahead of the ego-vehicle, types of the road users or vehicles, a predicted behavior related to at least one road user, and/or the map data. The cost function may include any combination of these parameters. The road users for this illustrative example may include, in particular, road users of a crowd of road users. Accordingly, the processor may perform these functions for road users of the crowd of road users.

For example, the cost function may be formulated as $f(L_r, L_f, \Delta V, \Delta T, \text{V-Type}, B, M)$, including a parameter based on the length of the line of vehicles detected behind the ego-vehicle ($L_r$), a parameter based on the length of the line of vehicles detected ahead of the ego-vehicle ($L_f$), a parameter based on a speed difference between the speed of the ego-vehicle and a speed related to the environment (e.g. maximum allowed speed or average speed) ($\Delta V$), a parameter based on a period of time starting from a detection of at least one vehicle of the line of vehicles behind the ego-vehicle ($\Delta T$), a parameter based on the type of vehicles of the line of vehicles (V-Type), a parameter based on a predicted behavior for at least one vehicle of the line of vehicles (B), and a parameter based on the current road (M). Furthermore, the cost function may include a weight coefficient for each of the parameters. The determiner 503 may determine the weight coefficient based on the environment information 511 for various scenarios. The cost function may be formulated similarly for other types of road users (e.g. road users or vulnerable road users in a crowd of road users).

At least one of the parameters may affect the cost value according to a sigmoid function defined for the parameter. In other words, a parameter, for example, the parameter based on the size of the road users behind or ahead the ego-vehicle ($L_r$, $L_f$) may result in a cost value indicating that the ego-vehicle may not prioritize the anticipated movement of the road users over the predicted movement of the ego-vehicle in case the size is small (i.e. below a predefined threshold). In case the length is long (i.e. above a predefined threshold), the parameter may cause the cost value to indicate that the ego-vehicle to prioritize the anticipated movement of the at least one road user of the road users over the predicted movement of the ego-vehicle.

Figure 6:
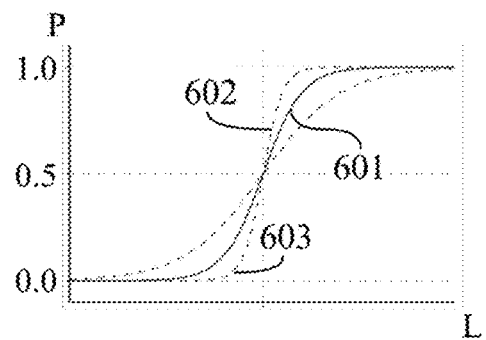
FIG. 6 shows a graph for exemplary sigmoid functions for the parameter based on a size amount of a crowd of road users.

FIG. 6 shows a graph for exemplary sigmoid functions for the parameter based on a length of a line of vehicles. The graph shows a detected length of a line of vehicles over the parameter value. The graph includes a first sigmoid function 601, a second sigmoid function 602, and a third sigmoid function with different characteristics for the parameter based on the length of the line of vehicles behind the ego-vehicle. As shown, the parameter P may include a normalized parameter.

Referring back to FIG. 5, the parameters based on the speed difference ($\Delta V$) and the period of time ($\Delta T$) may affect the cost function in a similar manner. As the speed difference ($\Delta V$), referring to the speed difference between the speed of the ego-vehicle and the speed related to the environment, increases, the resulting cost value may indicate the ego-vehicle to increase the priority of the anticipated movement of the road users over the predicted movement of the ego-vehicle. Similarly, as the period of time ($\Delta T$) that the road users are detected behind the vehicle increases, the resulting cost value may indicate the ego-vehicle to increase the priority of the anticipated movement of the road users over the predicted movement of the ego-vehicle. Accordingly, these parameters may also include sigmoid functions with predefined characteristics.

As indicated above, the determiner 503 may use further parameters or various cost functions based on the environment information 511. The determiner 503 may use a plurality of cost functions in order to determine to prioritize the anticipated movement of the road users over the predicted movement of the ego-vehicle. The determiner 503 may select the cost function based on the position of the road users relative to the ego-vehicle and the anticipated movements, or the types of road users.

Figure 7:
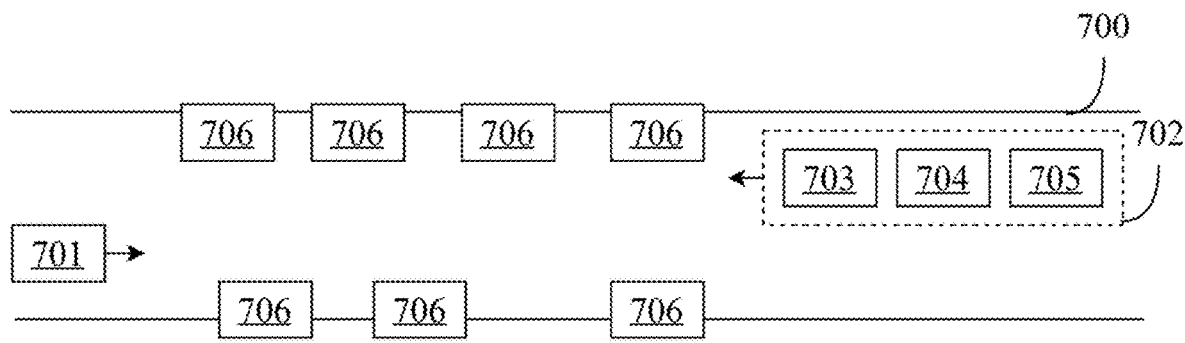
FIG. 7 shows an illustration of a road environment.

For example, FIG. 7 shows an illustration of a road environment. In this illustrative example, the environment information may indicate that the road environment 700 includes the ego-vehicle 701 in a road allowing bidirectional traffic, the ego-vehicle being predicted to travel in one direction, a crowd of road users (e.g. line of vehicles 702) including a plurality of vehicle 703, 704, 704 in the road, and the line of vehicles is anticipated to travel in the opposite direction towards the ego-vehicle, and the road allows traffic of only one direction due to parked vehicles 706 along the road. In this example, a predicted movement for the ego-vehicle may include to continue to travel in the one direction, and an anticipated movement for the vehicles of the line of vehicles 702 may include to continue to travel in the opposite direction.

Accordingly, based on the environment information 511 indicating that the road users in the environment is anticipated to move towards ego-vehicle, instead of calculating the push force of the line of vehicles to the ego-vehicle, the determiner 503 may calculate the cost function in order to calculate the pull force of the road users to the ego-vehicle based on the position of the road users and the anticipated movement.

The determiner 503 may estimate a first cost value based on a first cost function for a first crowd of road users, and the determiner 503 may estimate a second cost value based on a second cost function for a second crowd of road users in the road environment. The determiner 503 may determine to prioritize the anticipated movement of at least one road user of the crowd of road users over the predicted movement of the ego-vehicle based on the first cost value and the second cost value. Accordingly, in a road scenario according to FIG. 7, the determiner 503 may prioritize the predicted movement of the ego-vehicle over the anticipated movement of the line of vehicles by calculating the pull forces instead of push forces. The determiner 503 may determine to use pull forces based on the environment information 511 indicating that the size of the crowd of road users ahead of the ego-vehicle is greater than the size of the crowd of road users behind the ego-vehicle.

Furthermore, the parameter based on the road user types, such as vehicle types of road users may affect the cost value for various aspects. For example, the environment information 511 may indicate that the vehicle types of the vehicles of the road users include vehicles that may have similar physical restrictions as the ego-vehicle. The ego-vehicle may be a truck, and the environment information 511 may indicate that the road users behind the ego-vehicle include trucks. Accordingly, the parameter may affect the cost value towards not to prioritize the anticipated movement of the road users over the predicted movement of the ego-vehicle. The environment information 511 may indicate that the users include a sports car (e.g. the first trailing car behind the ego-vehicle is a sports car), and the parameter may affect the cost value towards to prioritize the anticipated movement of the road users over the predicted movement of the ego vehicle.

The determiner 503 may further estimate the cost value based on a calculation of a risk parameter indicating the safety of a maneuver by at least one road user of road users, for example, the first trailing vehicle behind the ego-vehicle. The determiner 503 may calculate the risk parameter based on a predefined function. The function may include parameters including a parameter indicating a distance of an approaching road user, or a size of road users detected ahead of the ego-vehicle, a parameter based on the type of the road user, a behavior for the road user, and the shape of the road.

The determiner 503 may further calculate an aggregated risk parameter for a plurality of road users. The determiner 503 may calculate a risk parameter as indicated above for the plurality of road users, and the determiner 503 may sum each risk parameter calculated for a road user of the plurality of road users to obtain the aggregated risk parameter. The risk parameter or the aggregated risk parameter may include a normalized value behind 0 and 1. The determiner 503 may further calculate a safety parameter based on the aggregated risk parameter. Considering that the aggregated risk parameter may include a normalized value, the determiner may calculate the safety parameter as 1-R, with R being the aggregated risk parameter. In various examples, the determiner 503 may estimate the overtaking risk according to a predefined machine learning model, or based on a collision risk approach.

The data processing module 501 may predict the behavior of the at least one road user based on the behavior of the at least one road user detected over a period of time according to the sensor data. The predicted behavior may include an indication of how aggressive were the at least one road user over the period of time. For example, the at least one road user may be a vehicle. The data processing module 501 may obtain an average distance indicating the distance between the ego-vehicle and the at least one vehicle calculated over a period of time. An average distance of a low distance may indicate that the at least one vehicle may exhibit an aggressive behavior. Furthermore, the data processing module 501 may measure how quickly the at least one vehicle closes a gap between the ego-vehicle and the at least one vehicle. A quick gap closure may indicate that the at least one vehicle may exhibit an aggressive behavior. Accordingly, the data processing module 501 may provide the indication of the aggressiveness of the at least one road user.

The determiner 503 may determine the parameter of the predicted behavior for at least one road user based on the indication of the aggressiveness that the data processing module 501 may provide. Accordingly, the parameter of the predicted behavior may affect the cost value towards to prioritize the anticipated movement of the road users over the predicted movement of the ego-vehicle as the indication of the aggressiveness increases. The determiner 503 may aggregate a plurality of aggressiveness indications for a plurality of road users to obtain the parameter of the predicted behavior.

Furthermore, the determiner 503 may estimate the cost value based on an estimation of a period of time to be lost by at least one road user according to an anticipated movement of the at least one road user and the predicted movement of the ego-vehicle in the predetermined route.

The environment information 511 may indicate a possibility for the vehicles of the road users to pass the ego-vehicle at a location in the predetermined route. The determiner 503 may calculate the time to be lost by at least one road user based on the predicted speed of the ego-vehicle until the ego-vehicle reaches the location, and a speed related to the road environment. The determiner 503 may calculate the time to be lost by at least one road user based on the maximum allowed speed, or the average speed based on the predetermined route 512 and the environment information 511. The determiner 503 may similarly calculate the time to be lost for a plurality of road users. For example, if a vehicle of a crowd of road users follows a slow ego-vehicle for 5 minutes, and drives only 70 km/h instead of 100 km/h, the vehicle of the crowd of road users may be estimated to lose 90 seconds. If this would happen to 10 vehicles, the lost time would be 900 seconds for 10 vehicles. The determiner 503 may further consider the environment information 511 that may indicate the route of the road users, desired speed of road users, etc.

Furthermore, the determiner 503 may predict the cost value based on the environment information 511. The determiner 503 may predict any of the parameters to be used with the predefined cost function based on the environment information 511 for the past. For example, the environment information 511 may indicate the number of vehicles that have passed the ego-vehicle using a passing lane in a certain period of time, and the determiner 503 may predict a size for predicted road users based on the indicated number of vehicles and a predicted period of time for the ego-vehicle to stay in that passing lane. The determiner 503 may predict a speed that is different from the current speed of the ego-vehicle for the passing lane, for example, to perform an overtaking maneuver.

Furthermore, the determiner 503 may predict a cost value to reach a location (e.g. the target location) according to the predefined cost function based on the environment information 511 for the past period of time. The determiner 503 may determine to set a new route in case the predicted cost value is above a predefined threshold with an intention to avoid increased size of the road users. The determiner 503 may predict cost values for a plurality of routes to reach to the location, and the determiner 503 may select one of the plurality of routes based on the predicted cost values. The determiner 503 may select the route that has the minimum cost value, and determine the selected route as a vehicle action for the ego-vehicle.

Furthermore, the determiner 503 may determine a vehicle action for the ego-vehicle. The determiner 503 may determine the action based on the predetermined route of the ego-vehicle. The determiner 503 may determine a vehicle action for the ego-vehicle based on the estimated cost value or estimated cost values. The determiner 503 may determine to allow the anticipated movement of the road users. The determiner 503 may determine to allow the anticipated movement of the road users. The action may include an adjustment of the driving policy of the ego-vehicle.

The determined action may include to stop the ego-vehicle at a turnout location, or at a safe location with an intention to allow the other road users to pass the ego-vehicle. The determined action may include to slow down the ego-vehicle. The determiner 503 may determine the action to slow down the ego-vehicle, in case the environment information 511 indicates that a safe overtaking of other road users may be possible. For example, the environment information 511 may indicate that the road according to the predetermined road is eligible to pass a vehicle (e.g. the road ahead is straight and no vehicles ahead are detected). The determined action may further include to identify a stopping location with an intention to allow the road user ahead to pass.

The determiner 503 may identify a turnout location based on the map data that may be located at a predefined proximity to the predetermined route of the ego-vehicle and determine to stop or slow down the ego-vehicle at the turnout location. The determiner 503 may identify a passing lane that may be located at a predefined proximity to the predetermined route of the ego-vehicle based on the map data and determine to maneuver the ego-vehicle towards the passing lane and slow down the ego-vehicle within the passing lane. The determiner 503 may identify a safe location that may be located at a predefined proximity to the predetermined route of the ego-vehicle to stop the ego-vehicle according to the environment information 511.

The determiner 503 may identify a plurality of locations that the ego-vehicle may stop and/or slow down, and the determiner 503 may select one of the plurality of locations that the ego-vehicle may stop and/or slow down. The determiner 503 may select one of the plurality of such locations based on predicted cost value for each of them. Accordingly, the determiner 503 may predict a cost value for each of the identified locations as provided in this disclosure based on the environment information 511. For example, the determiner 503 may predict the size of the road users for each of the identified locations for instances of time that the ego-vehicle will arrive at each of the identified locations based on the number of road users intersecting with the predetermined past route of the ego-vehicle, and the determiner 503 may predict the cost value based on the predicted size or amount of the road users for each of the identified locations. For example, the determiner 503 may select the location that has the least cost value.

Furthermore, the determiner 503 may select the identified location based on a vehicle cost value that the determiner 503 may calculate based on the predetermined route. The vehicle cost value may indicate the cost for the ego-vehicle to stop or slow down at the location. The determiner 503 may calculate the vehicle cost value based on an ego-vehicle cost function including a parameter based on the distance of the identified location to the predetermined route, a parameter based on a predicted loss of time for the ego-vehicle that may further be based on the size of the road users that the determiner 503 may predict for the identified location, a parameter based on the action (i.e. slowing down or stopping), etc. The determiner 503 may select the identified location according to a combination of the predicted vehicle cost value and the predicted cost value.

Furthermore, the environment information 511 may indicate a possible maneuver to allow the anticipated movement of at least one road user of the road users. The determiner 503 may further determine a possible maneuver to allow the anticipated movement of at least one of the road users based on the environment information 511 and the estimated cost value. The determiner 503 may further indicate to perform a maneuver by the ego-vehicle facilitating the anticipated movement of at least one of the road users based on the environment information 511.

In various scenarios, another road user may prevent the movement of the ego-vehicle. For example, the environment information 511 may indicate that there another road user, such as a vehicle or a vulnerable road user blocking the road, and other vehicles of the road users may not be able to detect the another road user. The determiner 503 may determine to provide indication of a presence of the road user (e.g. vulnerable road user) preventing the predicted movement of the ego-vehicle to at least one road user of the road users.

Furthermore, the determiner 503 may determine to provide an indication of the determined action. For example, the ego-vehicle may indicate to at least one road user of the road users that the ego-vehicle has determined an action to allow the anticipated movement of at least one road user of the road users. The determiner 503 may further determine to provide an indication of the estimated cost value to indicate the amount of the push/pull forces calculated for the ego-vehicle.

Furthermore, the determiner 503 may provide an indication of the determined action to the controller 504. The controller may generate a control signal based on the determined action. The control signal may include information indicating the determined action to the ego-vehicle (e.g. the control system 200 of the vehicle). The controller 504 may provide the control signal to the vehicle control system 520. Furthermore, the determiner 503 may further receive instructions from the controller 504.

The vehicle control system 520 may receive the control signal which the controller 504 provides and generate a vehicle control signal based on the received control signal in order to control the vehicle to perform the determined action. For example, the vehicle control signal 520 may control the mobility system of the vehicle in order to perform the determined actions that may relate to the mobility system of the vehicle based on the received control signal.

For example, the vehicle control system 520 may control the mobility system based on the control signal indicating the determined action includes a driving action. Accordingly, the vehicle control system 520 may control the mobility system to adjust the speed, acceleration of the vehicle, or drive the vehicle according to the selected route or drive the vehicle to a selected location as indicated by the received control signal. The vehicle control system 520 may accordingly update the predetermined route of the ego-vehicle and schedule the determined actions including maneuvers.

Furthermore, the vehicle control system 520 may provide information indicating the determined action to an occupant of the ego-vehicle. The vehicle control system 520 may provide the information via a user interface of the ego-vehicle. The vehicle control system 520 may further receive a response from the user via the user interface with respect to whether the occupant accepts the determined action to be performed, and the vehicle control system 520 may provide instructions to corresponding systems in case the occupant accepts the determined action to be performed.

The vehicle control system 520 may determine to provide the information or to request a response from the occupant based on the determined action. Alternatively, or additionally, the received control signal may indicate that the vehicle control system 520 should provide information with respect to the determined action to the occupant, or the vehicle control system 520 should request a response with respect to the determined action to the occupant. For example, the vehicle control system 520 may request a response only on predetermined action types (e.g. changing the route).

Furthermore, the vehicle control system 520 may provide the determined indications to other road users. The vehicle control system 520 may accordingly provide indications via indicators of the ego-vehicle. The vehicle control system 520 may provide indications via communication messages (e.g. V2X messages) to other road users based on the determined actions. For example, the vehicle control system 520 may encode V2X messages to indicate the determined actions, and a communication interface of the vehicle control system 520 may broadcast the V2X messages for reception of other road users in the road environment.

With respect to the illustrative example provided for FIG. 5, the road users may include road users in a crowd of road users. Accordingly, the processor may apply the provided functions for the road users of the crowd of road users.

Figure 8:
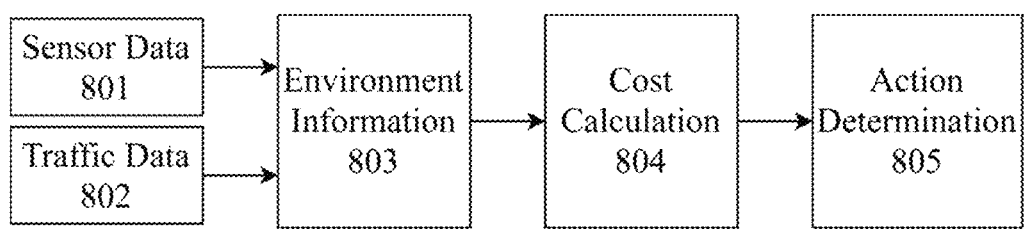
FIG. 8 illustrates various processing steps.

FIG. 8 illustrates various processing steps for the device in accordance with this disclosure. The processing may include obtaining sensor data 801 that may provide sensory information related to a road environment including information about other road users and objects in the road environment, obtaining traffic data 802 that may provide information related to the road environment via other sources such as other road users, infrastructure units, navigation services including information about other road users, objects, routes, intents of other road users, etc. The device may continuously generate and update environment information 803 based on the sensor data 801 and the traffic data 802, acting as an information source for the device with respect to the road environment and the predetermined route of a vehicle (e.g. ego-vehicle).

The device may calculate cost values 803 as the ego-vehicle follow its route based on the environment information. In response to the calculated cost value indicating that the vehicle may prioritize an anticipated (e.g. intended) movement of at least one road user of the detected road users over a predicted movement of the vehicle at an instance of time, the device may determine an action 804 to be taken to prioritize the anticipated movement of the at least one road user of the detected road users over the predicted movement of the vehicle.

Figure 9:
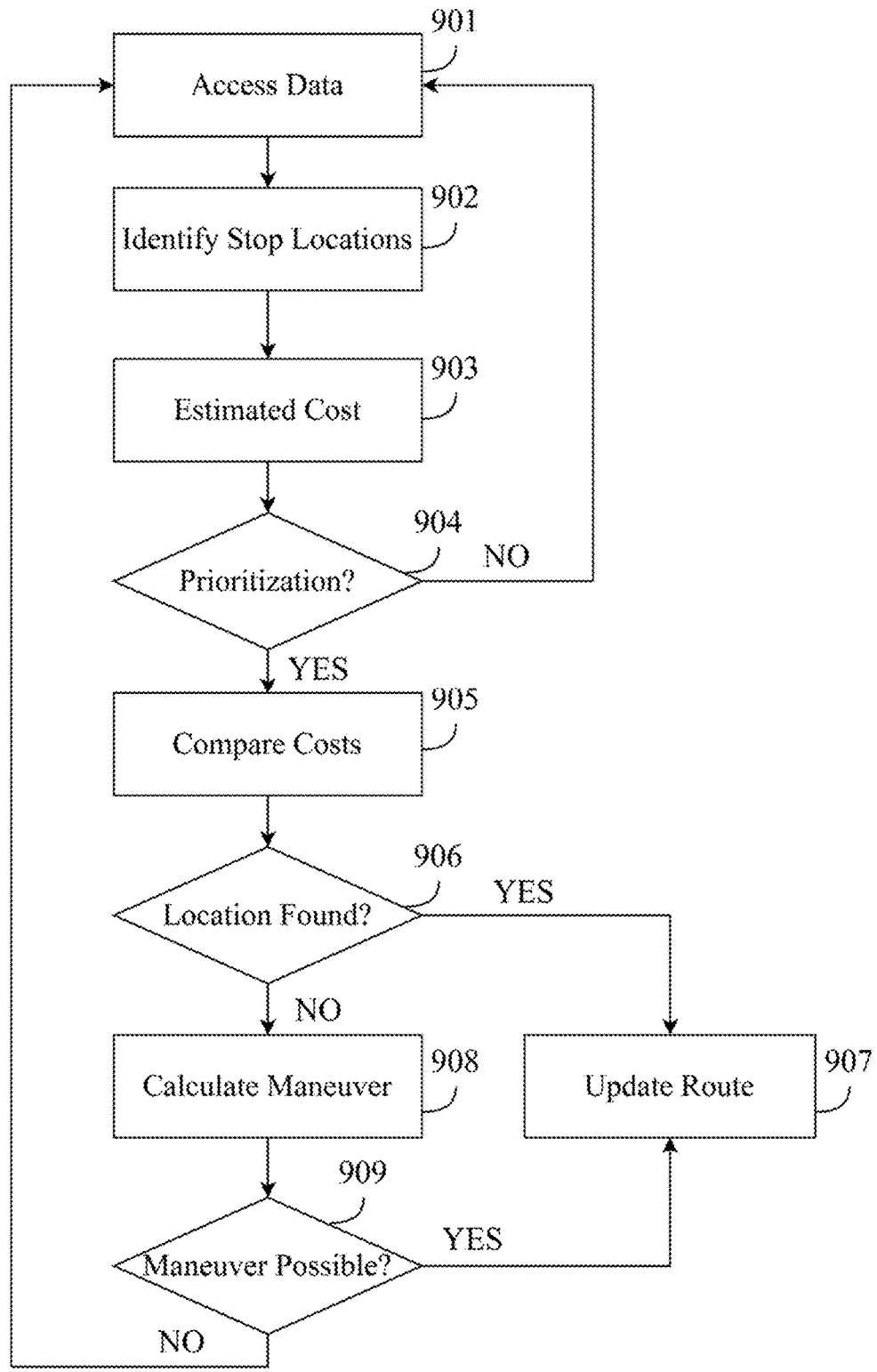
FIG. 9 illustrates an exemplary flow diagram for determining an action to be taken by a vehicle.

FIG. 9 illustrates an exemplary flow diagram for determining a vehicle action by a vehicle. A vehicle (e.g. ego-vehicle) may include a processor configured to determine a vehicle action by the vehicle as provided in this disclosure. The processor may perform these steps when the environment information indicates a presence of a crowd of road users in the road environment. The processor may perform these steps when the environment information further indicates that the ego-vehicle is the leading vehicle. The processor may determine not to perform these steps in case the environment information indicates that the ego-vehicle is not the leading vehicle of the crowd of road users, or in case the environment information indicates that the ego-vehicle is the leading vehicle but the speed of the vehicle of the ego-vehicle depends on another road user (e.g. a vulnerable road user blocking the road ahead of the ego-vehicle).

The processor may access the data 901 including environment information including information related to the environment of the ego-vehicle and the route information including information related to the predetermined route of the ego-vehicle. The processor may identify stop locations 902 based on the environment information (e.g. stop and/or turnover locations in the environment of the ego-vehicle) and the route information (e.g. stop and/or turnover locations along the route of the ego-vehicle).

Optionally, the processor may determine whether the ego-vehicle is the leading vehicle of the road users, whether the ego-vehicle is within a predefined proximity of road users, or whether the predicted movement of the ego-vehicle is prevented by another road user (e.g. a vulnerable road user). In case the environment information indicates that the ego-vehicle is not the leading vehicle of the road users, or in case the environment indicates that there is no crowd of road users in the predefined proximity, or in case the environment information indicates that the ego-vehicle is the leading vehicle but the speed of the vehicle of the ego-vehicle depends on another road user (e.g. a vulnerable road user blocking the road ahead of the ego-vehicle), the processor may not identify any locations. The processor may receive the estimated cost value or estimate the cost value 903, and determine whether the ego-vehicle prioritizes an anticipated movement of at least one road user of the road users over a predicted movement of the ego-vehicle according to the estimated cost value (e.g. if the cost value is above a predetermined threshold).

For this illustrative example, the ego-vehicle may travel in a road environment with only one lane permitted for the traffic for the heading of the ego-vehicle, and the environment information may indicate that there is a crowd of road users behind the ego-vehicle (e.g. a line of vehicles), ego-vehicle is the leading vehicle, and the speed of the ego-vehicle is lower than the average speed for the current location of the ego-vehicle. Accordingly, the predicted movement of the ego-vehicle may be to follow the predetermined route of the ego-vehicle using the lane, and the anticipated movement of at least one vehicle in the crowd of road users (e.g. the closest vehicle to the ego vehicle that belongs to the crowd of road users) may include an intention of the at least one vehicle provided with a V2X message to the ego-vehicle that the at least one vehicle intends to pass the ego-vehicle. Accordingly, an anticipated movement of the at least one vehicle may include the at least one vehicle passing the ego-vehicle.

In case the processor determines that the ego-vehicle does not prioritize 904 the predicted movement of at least one road user of a crowd of road users over the predicted movement, the processor may restart the process. In case the processor determines to prioritize 904, the processor may compare 905 the estimated cost value with costs of each identified location in order to select one of the identified locations to stop or slow down. In case the processor determines one of the identified locations 906 based on the comparison, the processor may update 907 the predetermined route of the ego-vehicle to guide the ego-vehicle to the determined location. The processor may determine if the predicted cost for the ego-vehicle to travel to one of (or each of) the identified locations is lower than the estimated cost value to select one of the identified locations.

In case the processor does not find a location to stop or slow down based on the comparison 906, the processor may calculate a maneuver 908 to perform in order to prioritize the at least one vehicle. For example, the processor may calculate the maneuver 908 by identifying possible locations in the environment based on the environment information in order to stop or slow down the ego-vehicle. For example, if the ego-vehicle drove on a two-lane road with a crowd of road users of potentially faster vehicles behind, it may slow down and indicate to the trailing vehicles that they can overtake. In case the processor identifies that a maneuver is possible to stop or slow down the ego-vehicle 909, allowing at least one road user of the crowd of road users to pass the ego-vehicle, the processor may 907 update the predetermined route in order to allow the movement of the at least one road user of the crowd of road users. In case the processor 909 does not identify such maneuver, the processor may start the process again by accessing the data 901.

Figure 10:
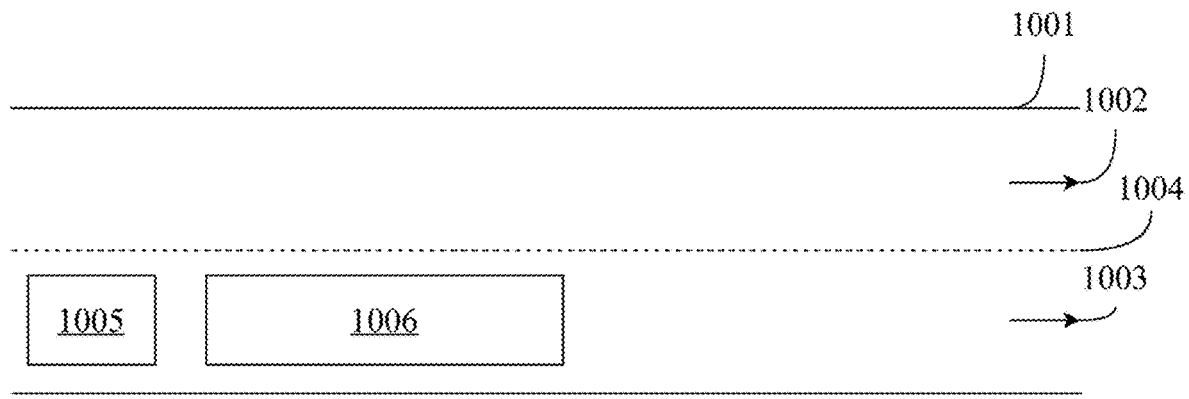
FIG. 10 shows an illustration of a road environment.

FIG. 10 shows an illustration of a road environment. The road environment 1001 includes two lanes 1002, 1003 that are depicted as allowing traffic flow towards the right-hand side that are separated by a road marking 1004 indicating that passing a vehicle is allowed. An autonomous vehicle (e.g. ego-vehicle) 1005 may include the device as provided in this disclosure. The ego-vehicle 1005 may be a trailing vehicle of a line of vehicles following a leading vehicle 1006.

For this illustrative example, the device of the ego-vehicle 1005 may determine whether the ego-vehicle 1005 overtakes the leading vehicle 1006 based on the prediction of a cost value according to the environment information. The environment information may indicate that a number N vehicles have passed the ego-vehicle 1005 in a past period of time T. The device of the ego-vehicle 1005 may predict that a period of time needed to overtake the leading vehicle 1006 is To seconds based on the speed of the leading vehicle 1006 and a predicted speed for the ego-vehicle during the overtaking maneuver. Accordingly, the device of the ego-vehicle 1005 may further predict a size of road users by predicting a length of line of vehicles that may build up during the overtaking maneuver of the ego-vehicle based on N, T, and To, and the device of the ego-vehicle 1005 may determine whether the ego-vehicle performs the overtaking maneuver based on the predicted length of the line of vehicles (e.g. based on a predefined threshold).

Furthermore, the device of the ego-vehicle 1005 may use a cost function that is similar to the cost functions described in this disclosure to make the determination. The device of the ego-vehicle 1005 may similarly perform predictions for further parameters based on the environment information related to a past period of time T. Based on the prediction of a cost value according to the predefined cost function, the ego-vehicle 1005 may determine to perform the maneuver to overtake the leading vehicle 1006 in case the predicted cost value is below a predefined threshold, or the ego-vehicle 1005 may determine to follow the leading vehicle 1006 in case the predicted cost value is above the predefined threshold.

Figure 11:
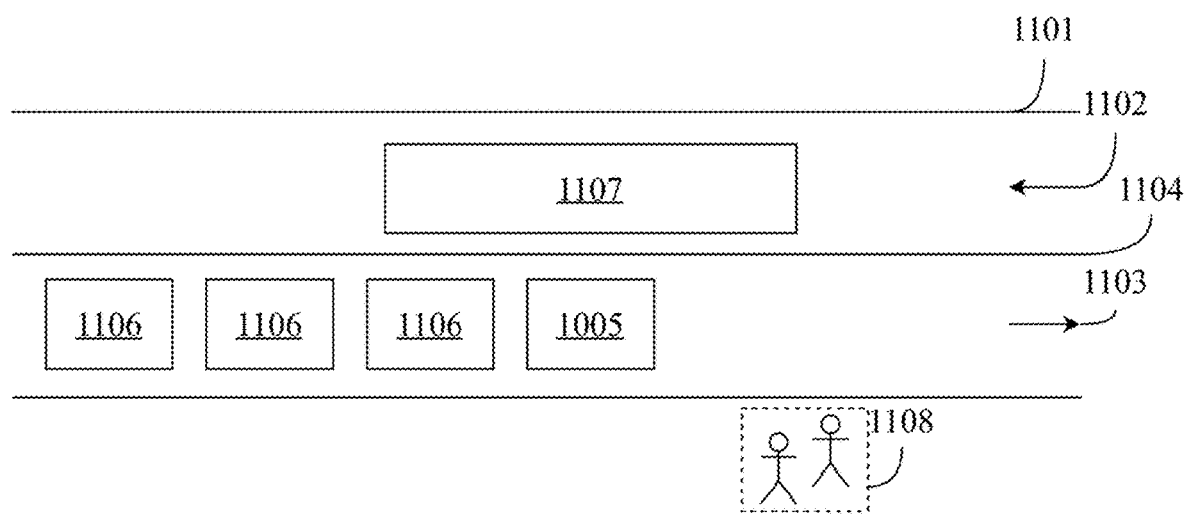
FIG. 11 shows an illustration of a road environment.

FIG. 11 shows another illustration of a road environment. The road environment 1101 includes a first lane 1102 depicted as allowing traffic flow towards a left-hand side, a second lance 1103 depicted as allowing traffic flow towards the right-hand side. The lanes are separated by a road marking 1104 indicating that passing a vehicle is not allowed. An autonomous vehicle (e.g. ego-vehicle) 1105 may include the device as provided in this disclosure. The ego-vehicle 1105 may be a leading vehicle of a line of vehicles and trailing vehicles 1106 may follow the ego-vehicle 1105.

The road environment 1101 may further include a transportation vehicle 1107 (e.g. a bus, a tram, etc.) that transports multiple road users. In this illustrative example, the device of the ego-vehicle 1105 may further detect the pedestrians 1108. The device may further anticipate the movement of the pedestrians 1108 based on the environment data indicating movements/behavior of the pedestrians 1108 and that the transportation vehicle 1107 stops or approaches to a location to allow passengers to get in the transportation vehicle 1107.

The device of the ego-vehicle 1105 may use a first cost function that is similar to the cost functions to estimate a first cost value for the crowd of road users (i.e. the line of vehicles) behind the ego-vehicle 1105. Furthermore, the ego vehicle 1105 may use a second cost function that is similar to the cost functions to estimate a second cost value for the pedestrians 1108. The device of the ego-vehicle 1105 may estimate the cost value based on the environment information indicating a further pull force that the transportation vehicle 1107 may form to the pedestrians 1108.

In this illustrative example, the device of the ego-vehicle 1105 may predict that the pedestrians 1108 may want to run towards the transportation vehicle 1107. For example, the device of the ego-vehicle 1105 may add a bias value to the estimated cost value, in which the device of the ego-vehicle 1105 may calculate with a similar cost function in order to calculate the pull force that the transportation vehicle 1107 may form to the pedestrians 1108.

Furthermore, the device of the ego-vehicle 1105 may compare the first cost value and the second cost value. Based on the comparison of the first cost value and the second cost value, the device of the ego-vehicle 1105 may determine a maneuver (e.g. stop) allowing the pedestrians to cross the road. Alternatively, the device of the ego-vehicle 1105 may determine to continue to its predetermined route, exemplarily based on the number of the trailing vehicles 1106.

Figure 12:
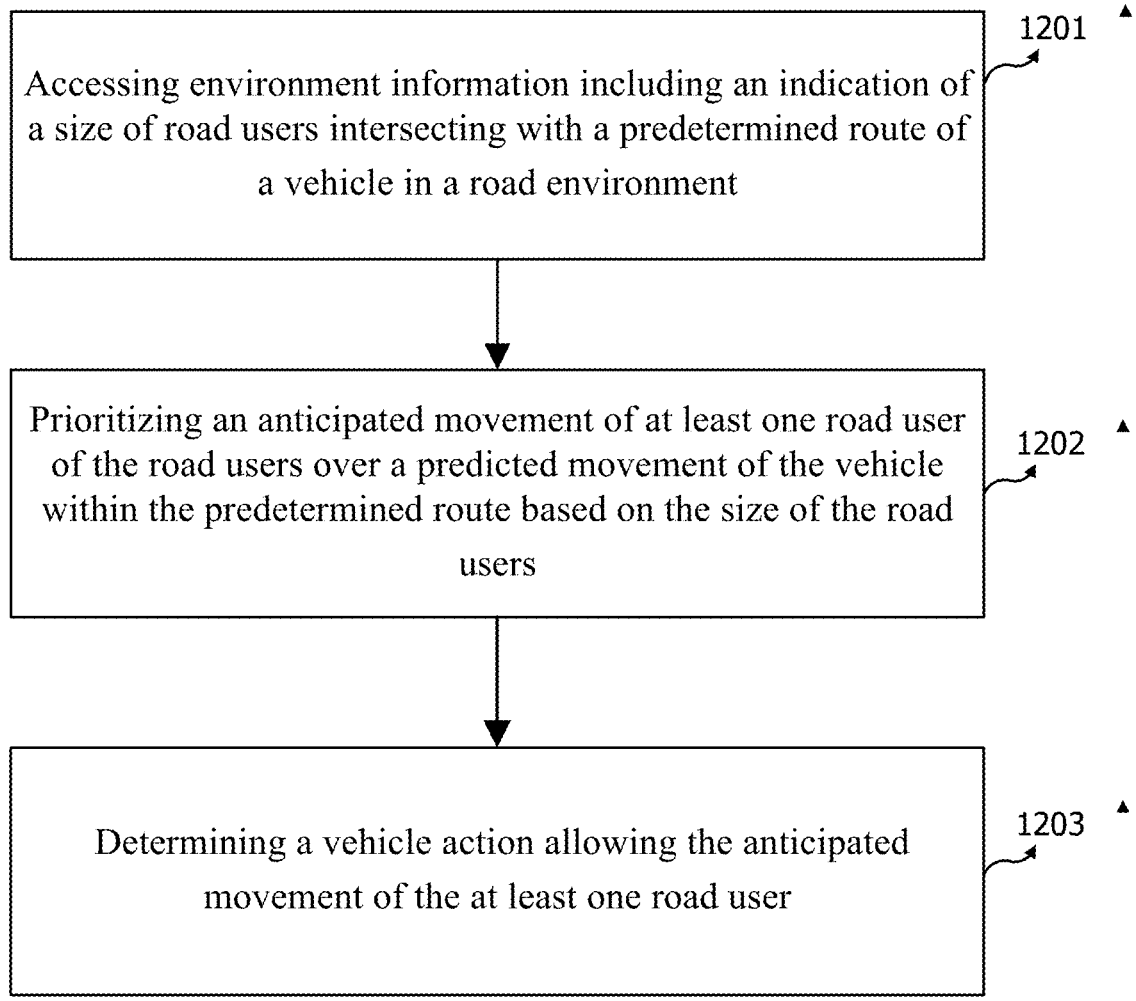
FIG. 12 shows schematically an example of a method.

FIG. 12 shows schematically an example of a method. The method may include accessing 1201 environment information including an indication of a size of road users intersecting with a predetermined route of a vehicle in a road environment, prioritizing 1202 an anticipated movement of at least one road user of the road users relative to a predicted movement of the vehicle within the predetermined route based on the size of the road users; and determining 1203 a vehicle action allowing the anticipated movement of the at least one road user of the road users.

In various examples, a non-transitory computer-readable medium including one or more instructions which, if executed by a processor, cause the processor to: access environment information including an indication of a size of road users intersecting with a predetermined route of a vehicle in a road environment, prioritize an anticipated movement of at least one road user of the road users relative to a predicted movement of the vehicle within the predetermined route based on the size of the road users; and determine a vehicle action allowing the anticipated movement of the at least one road user of the road users. The one or more instructions may further cause the processor to act as provided in this disclosure.

The following examples pertain to further aspects of this disclosure.

In example 1, the subject matter includes a device. The subject matter including a processor configured to access environment information including an indication of size of road users intersecting with a predetermined route of a vehicle in a road environment; prioritize an anticipated movement of at least one of the road users over a predicted movement of the vehicle within the predetermined route based on the size of road users; and determine a vehicle action allowing the anticipated movement of the at least one road user.

In example 2, the subject matter of example 1, wherein the indication of the size of the road users includes at least one of a number of road users, a space occupied by the road users, or a length of a line for the road users. In example 3, the subject matter of example 1 or example 2, wherein the processor is further configured to prioritize the anticipated movement of the at least one road user based on the environment information. In example 4, the subject matter of any one of examples 1 to 3, wherein the environment information further includes information indicating at least one of road user types of at least one road user, speed of at least one road user, predicted intent of at least one road user, and/or position of at least one road user.

In example 5, the subject matter of any one of examples 1 to 4, wherein the environment information further includes information indicating at least one of a size of road users behind the vehicle, a length of the road users ahead of the vehicle, a size of road users in a proximity to the vehicle, a size of road users in a detectable proximity to the vehicle, a speed related to the road environment, a duration for at least one road user to stay behind the vehicle, a duration for at least one road user to stay ahead of the vehicle, a predicted behavior related to at least one road user, and/or a map data including the road environment.

In example 6, the subject matter of any one of examples 1 to 5, wherein the environment information further includes information indicating a plurality of objects within the road environment, types of the plurality of objects, and speed of the plurality of objects. In example 7, the subject matter of any one of examples 1 to 6, wherein the processor is further configured to calculate a cost value for the road users based on the size of the road users to prioritize the anticipated movement of the at least one road user. In example 8, the subject matter of example 7, wherein the processor is further configured to prioritize the anticipated movement of the at least one road user based on the cost value according to a predefined social force model. In example 9, the subject matter of any one of examples 7 or 8, wherein the processor is further configured to calculate the cost value based on the predetermined route.

In example 10, the subject matter of any one of examples 7 to 9, can optionally include that the processor is further configured to calculate the cost value based on a predefined cost function. In example 11, the subject matter of example 10, can optionally include that the cost function further includes at least one parameter based on at least one of the following: a size of the road users behind the vehicle, a size of the road users ahead of the vehicle, an size of the road users in the road environment, a speed of the vehicle, a speed related to the road environment, a duration for at least one road user of the road users to stay behind the vehicle, a duration for at least one road user of the road users to stay ahead of the vehicle, types of the vehicles, a predicted behavior related to at least one road user of the road users, and/or the map data.

In example 12, the subject matter of example 11, can optionally include that the speed related to the road environment includes received information indicating a predefined average speed for the road environment or a maximum allowed speed for the road environment. In example 13, the subject matter of any one of examples 11 or 12, can optionally include that the processor is further configured to predict the behavior related to the at least one road user of the road users based on the environment information. In example 14, the subject matter of any one of examples 11 to 13, can optionally include that the processor is further configured to predict the behavior related to the at least one road user of the road users based on an average distance between the vehicle and the at least one road user of the road users.

In example 15, the subject matter of any one of examples 11 to 14, can optionally include that the processor is further configured to predict the behavior related to the at least one road user of the road users based on a period of time in that the at least one road user of the road users closes a distance between the at least one road user of the road users and the vehicle after the distance occurs. In example 16, the subject matter of any one of examples 10 to 15, can optionally include that at least one of the parameters of the cost function is configured to affect the calculated cost value based on a predefined sigmoid function. In example 17, the subject matter of any one of examples 10 to 16, can optionally include that the parameters of the cost function are configured to affect the calculated cost value based on a plurality of predefined sigmoid functions may include a first sigmoid function for a first parameter of the parameters and a second sigmoid function for a second parameter of the parameters.

In example 18, the subject matter of example 17, can optionally include that the first sigmoid function is configured to affect the calculated cost value based on a first weight parameter and the second sigmoid function affects the calculated cost value based on a second weight parameter. In example 19, the subject matter of any one of examples 10 to 17, can optionally include that the processor is further configured to determine a risk parameter for at least one road user of the road users based on at least one of the size of the road users, a shape of the road environment, a type of the at least one road user of the road users, and/or a predicted behavior of the at least one road user of the road users. In example 20, the subject matter of example 19, can optionally include that the processor is further configured to determine the risk parameter based on a predefined machine learning model.

In example 21, the subject matter of any one of examples 19 or 20, can optionally include that the processor is further configured to prioritize the anticipated movement of the at least one road user of the road users based on the risk parameter. In example 22, the subject matter of any one of examples 10 to 21, can optionally include that the cost function includes a parameter may include an estimated period of time loss based on the speed of the vehicle and the duration for the at least one road user of the road users to stay behind the vehicle. In example 23, the subject matter of any one of examples 10 to 22, can optionally include that the processor is further configured to calculate a first cost value for a first crowd of road users and a second cost value for a second crowd of road users; can optionally include that the processor is further configured to prioritize the anticipated movement of the at least one road user of the road users based on the first cost value and the second value.

In example 24, the subject matter of example 23, can optionally include that the processor is further configured to prioritize the anticipated movement of the at least one road user of the road users by comparing the first cost value and the second cost value. In example 25, the subject matter of any one of examples 23 or 24, can optionally include that the first crowd of road users includes a crowd of road users located behind the vehicle and the second crowd of road users includes a crowd of road users located ahead of the vehicle. In example 26, the subject matter of any one of examples 23 to 25, can optionally include that the processor is further configured to classify the road users in the road environment to the first crowd of road users and the second crowd of road users based on the environment information. 27, the subject matter of any one of examples 10 to 26, can optionally include that the processor is further configured to determine the vehicle action based on the map data.

In example 28, the subject matter of example 27, can optionally include that the processor is further configured to identify a turnout location based on the map data and determine to stop or slow down the vehicle at the turnout location. In example 29, the subject matter of any one of examples 27 or 28, can optionally include that the processor is further configured to identify a plurality of stop and/or turnout locations based on the map data and compare costs of each identified location based on the cost function. In example 30, the subject matter of any one of examples 27 to 29, can optionally include that the processor is further configured to identify a plurality of stop and/or turnout locations based on the map data, and select one of the identified locations based on a predicted effect to the cost value for selecting the one of the identified locations.

In example 31, the subject matter of any one of examples 27 to 30, can optionally include that the processor is further configured to identify a plurality of stop and/or turnout locations based on the map data, calculate a vehicle cost value for each of the identified locations, and select one of the identified locations that has the least vehicle cost value, based on a comparison of the least vehicle cost value and the calculated cost value for the vehicles of the road users. In example 32, the subject matter of any one of examples 30 or 31, can optionally include that the processor is configured to determine the action based on the selected identified location. In example 33, the subject matter of any one of examples 27 to 32, can optionally include that the processor is further configured to identify a safe stop location based on the map data and determine to stop the vehicle at the safe stop location. In example 34, the subject matter of any one of examples 10 to 33, can optionally include that the processor is further configured to determine to slow down the vehicle and provide an indication for slowing down to allow the anticipated movement of the at least one road user of the road users.

In example 35, the subject matter of any one of examples 10 to 34, can optionally include that the processor is further configured to determine to perform a maneuver by the vehicle facilitating the anticipated movement of the at least one road user of the road users. In example 36, the subject matter of any one of examples 10 to 35, can optionally include that the processor is further configured to determine the action if the calculated cost value is above a predefined threshold. In example 37, the subject matter of any one of examples 10 to 36, can optionally include that the processor is further configured to calculate the cost value based on the predicted movement of the vehicle. In example 38, the subject matter of example 37, can optionally include that the processor is further configured to calculate the cost value based on the predicted maneuver using a parameter based on a predicted amount of the road users.

In example 39, the subject matter of example 38, can optionally include that the predicted maneuver includes occupying at least a portion of the road environment; can optionally include that the processor is further configured to determine the predicted amount of the road users based on a frequency of cars that have passed the vehicle, and the average velocity determined for the portion of the road environment. In example 40, the subject matter of any one of examples 37 to 39, can optionally include that the processor is further configured to calculate the cost value based on the predicted maneuver using a parameter based on a speed difference between the predicted speed of the vehicle and the average velocity determined for the portion of the road environment. In example 41, the subject matter of any one of examples 37 to 40, can optionally include that the processor is further configured to calculate the cost value based on the predicted maneuver using a parameter based on a predicted duration for the predicted maneuver and a predicted period of time based on the arrival of a first road user behind the vehicle. In example 42, the subject matter of any one of examples 10 to 41, can optionally include that the processor is further configured to predict the cost value for the predetermined route based on the environment information and adjust the predetermined route based on the predicted cost value.

In example 43, the subject matter of any one of examples 1 to 42, can optionally include that the processor is further configured to determine to perform the predicted movement of the vehicle, in case the vehicle is not a leading vehicle of the road users. In example 44, the subject matter of any one of examples 1 to 43, can optionally include that the processor is further configured to identify at least one road user of the road users that are predicted to leave the road environment, and prioritize the anticipated movement of the at least one road user of the road users based on road users of the road users that are predicted to stay in the road environment. In example 45, the subject matter of example 44, can optionally include that the processor is further configured to identify the at least one road user of the road users that are predicted to leave the road environment based on the environment information. In example 46, the subject matter of any one of examples 1 to 45, can optionally include that the processor is further configured to provide an indication of a presence of a vulnerable road user for at least one road user of the road users based on the environment information.

In example 47, the subject matter of any one of examples 1 to 46, can optionally include that the processor is further configured to detect a vulnerable road user preventing the predicted movement of the vehicle. In example 48, the subject matter of example 47, can optionally include that the processor is further configured to provide an indication for the predicted movement that is prevented by the vulnerable road user to at least one road user of the road users based on the anticipated movement of the at least one road user of the road users. In example 49, the subject matter of any one of examples 1 to 48, may further include: a vehicle interface to communicate with the vehicle; can optionally include that, the subject matter is configured to provide an indication of the determined action to the vehicle. In example 50, the subject matter of any one of examples 1 to 49, may further include: an interface to receive sensor data, and a memory to store the environment information; can optionally include that the processor is further configured to generate at least a first portion of the environment information based on the received sensor data and store the at least the first portion of the environment information in the memory.

In example 51, the subject matter of example 50, can optionally include that the interface is couplable to at least one sensor configured to provide the sensor data; can optionally include that the at least one sensor includes at least one of the following: an image acquisition subject matter, a proximity detector, an acoustic sensor, a pressure sensor, a motion detector, or an accelerometer. In example 52, the subject matter of any one of examples 50 or 51, may further include: a communication interface to receive environment data; can optionally include that the processor is further configured to generate at least a second portion of the environment information based on the received traffic data and store the at least second portion of environment information in the memory. In example 53, the subject matter of example 52, can optionally include that the communication interface is configured to receive vehicle-to-everything (V2X) messages including the traffic data. In example 54, the subject matter of example any one of examples 52 or 53, can optionally include that the processor is configured to encode a message indicating the determined action to be transmitted by the communication interface.

In example 55, the subject matter of example any one of examples 52 to 54, can optionally include that the processor is configured to encode a message indicating a determination of prioritizing the anticipated movement of the at least one road user of the road users to be transmitted by the communication interface. In example 56, the subject matter of example any one of examples 1 to 55, can optionally include that the road users includes a line of vehicles. In example 57, the subject matter of example any one of examples 1 to 56, can optionally include that the determined action enforces the vehicle to deviate from the predetermined route or stop. In example 58, an autonomous vehicle may include: the subject matter of any one of examples 1 to 57; a vehicle system communicatively coupled to, the subject matter, can optionally include that the vehicle system is configured to control the autonomous vehicle based on the determined action.

In example 59, a non-transitory computer-readable medium may include instructions which, if executed by a processor, cause the processor to: access environment information may include an indication of a size of the road users intersecting with a predetermined route of a vehicle in a road environment; prioritize an anticipated movement of at least one road user of the road users over a predicted movement of the vehicle within the predetermined route based on the size of the road users; determine a vehicle action allowing the anticipated movement of the at least one road user.

In example 60, a method may include: accessing environment information may include an indication of a size of the road users intersecting with a predetermined route of a vehicle in a road environment; prioritizing an anticipated movement of at least one road user of the road users over a predicted movement of the vehicle within the predetermined route based on the size of the road users; determining a vehicle action allowing the anticipated movement of the at least one road user of the road users.

In example 61, the subject matter of example 60, can optionally include that the indication of the size of the road users includes at least one of an indication of a number of road users in the crowd, an indication of a space occupied by the road users, or an indication of a length of a line for the road users. In example 62, the subject matter of example 60 or example 61, may further include: prioritizing the anticipated movement of the at least one road user of the road users based on the environment information. In example 63, the subject matter of any one of examples 60 to 62, can optionally include that the environment information further includes information indicating at least one of road user types of at least one road user of the road users, speed of at least one road user of the road users, predicted intent of at least one road user of the road users, and/or position of at least one road user of the road users. In example 64, the subject matter of any one of examples 60 to 63, can optionally include that the environment information further includes information indicating at least one of a size of the road users behind the vehicle, a length of the road users ahead of the vehicle, a size of the road users in a proximity to the vehicle, a size of the road users in a detectable proximity to the vehicle, a speed related to the road environment, a duration for at least one road user of the road users to stay behind the vehicle, a duration for at least one road user of the road users to stay ahead of the vehicle, a predicted behavior related to at least one road user of the road users, and/or a map data including the road environment. In example 65, the subject matter of any one of examples 60 to 64, can optionally include that the environment information further includes information indicating a plurality of objects within the road environment, types of the plurality of objects, and speed of the plurality of objects.

In example 66, the subject matter of any one of examples 60 to 65, may further include: calculating a cost value for the road users of the road users based on the size of the road users to prioritize the anticipated movement of the at least one road user of the road users. In example 67, the subject matter of example 66, may further include: prioritizing the anticipated movement of the at least one road user of the road users based on the cost value according to a predefined social force model. In example 68, the subject matter of any one of examples 66 or 67, may further include: calculating the cost value based on the predetermined route. In example 69, the subject matter of any one of examples 66 to 68, may further include: calculating the cost value based on a predefined cost function. In example 70, the subject matter of example 69, can optionally include that the cost function further includes at least one parameter based on at least one of the following: a size of the road users behind the vehicle, a size of the road users ahead of the vehicle, a size of the road users in the road environment, a speed of the vehicle, a speed related to the road environment, a duration for at least one road user of the road users to stay behind the vehicle, a duration for at least one road user of the road users to stay ahead of the vehicle, types of the vehicles of the road users, a predicted behavior related to at least one road user of the road users, and/or the map data.

In example 71, the subject matter of example 70, can optionally include that the speed related to the road environment includes received information indicating a predefined average speed for the road environment or a maximum allowed speed for the road environment. In example 72, the subject matter of any one of examples 70 or 71, may further include: predicting the behavior related to the at least one road user of the road users based on the environment information. In example 73, the subject matter of any one of examples 70 to 72, may further include: predicting the behavior related to the at least one road user of the road users based on an average distance between the vehicle and the at least one road user of the road users. In example 74, the subject matter of any one of examples 70 to 73, may further include: predicting the behavior related to the at least one road user of the road users based on a period of time in that the at least one road user of the road users closes a distance between the at least one road user of the road users and the vehicle after the distance occurs.

In example 75, the subject matter of any one of examples 69 to 74, can optionally include that at least one of the parameters of the cost function is configured to affect the calculated cost value based on a predefined sigmoid function. In example 76, the subject matter of any one of examples 69 to 75, can optionally include that the parameters of the cost function are configured to affect the calculated cost value based on a plurality of predefined sigmoid functions may include a first sigmoid function for a first parameter of the parameters and a second sigmoid function for a second parameter of the parameters. In example 77, the subject matter of example 76, can optionally include that the first sigmoid function is configured to affect the calculated cost value based on a first weight parameter and the second sigmoid function affects the calculated cost value based on a second weight parameter. In example 78, the subject matter of any one of examples 69 to 76, may further include: determining a risk parameter for at least one road user of the road users based on at least one of the size of the road users, a shape of the road environment, a type of the at least one road user of the road users, and/or a predicted behavior of the at least one road user of the road users.

In example 79, the subject matter of example 78, may further include: determining the risk parameter based on a predefined machine learning model. In example 80, the subject matter of any one of examples 78 or 79, may further include: prioritizing the anticipated movement of the at least one road user of the road users based on the risk parameter. In example 81, the subject matter of any one of examples 69 to 80, can optionally include that the cost function includes a parameter may include an estimated period of time loss based on the speed of the vehicle and the duration for the at least one road user of the road users to stay behind the vehicle. In example 82, the subject matter of any one of examples 69 to 81, may further include: calculating a first cost value for a first crowd of road users and a second cost value for a second crowd of road users; can optionally include that the processor is further configured to prioritize the anticipated movement of the at least one road user of the road users based on the first cost value and the second value.

In example 83, the subject matter of example 82, may further include: prioritizing the anticipated movement of the at least one road user of the road users by comparing the first cost value and the second cost value. In example 84, the subject matter of any one of examples 82 or 83, can optionally include that the first crowd of road users includes a crowd of road users located behind the vehicle and the second crowd of road users includes a crowd of road users located ahead of the vehicle. In example 85, the subject matter of any one of examples 82 to 84, may further include: classifying the road users in the road environment to the first crowd of road users and the second crowd of road users based on the environment information. In example 86, the subject matter of any one of examples 69 to 85, may further include: determining the vehicle action by the vehicle based on the map data. In example 87, the subject matter of example 86, may further include: identifying a turnout location based on the map data and determine to stop or slow down the vehicle at the turnout location. In example 88, the subject matter of any one of examples 86 or 87, may further include: identifying a plurality of stop and/or turnout locations based on the map data and compare costs of each identified location based on the cost function.

In example 89, the subject matter of any one of examples 86 to 88, may further include: identifying a plurality of stop and/or turnout locations based on the map data, and select one of the identified locations based on a predicted effect to the cost value for selecting the one of the identified locations. In example 90, the subject matter of any one of examples 86 to 89, identifying a plurality of stop and/or turnout locations based on the map data, calculate a vehicle cost value for each of the identified locations, and select one of the identified locations that has the least vehicle cost value, based on a comparison of the least vehicle cost value and the calculated cost value for the vehicles of the road users. In example 91, the subject matter of any one of examples 89 or 90, may further include: determining the action based on the selected identified location. In example 92, the subject matter of any one of examples 86 to 91, may further include: identifying a safe stop location based on the map data and determine to stop the vehicle at the safe stop location. In example 93, the subject matter of any one of examples 69 to 92, may further include: determining to slow down the vehicle and provide an indication for slowing down to allow the anticipated movement of the at least one road user of the road users. In example 94, the subject matter of any one of examples 69 to 93, may further include: determining to perform a maneuver by the vehicle facilitating the anticipated movement of the at least one road user of the road users.

In example 95, the subject matter of any one of examples 69 to 94, may further include: determining the action if the calculated cost value is above a predefined threshold. In example 96, the subject matter of any one of examples 69 to 95, may further include: calculating the cost value based on the predicted movement of the vehicle. In example 97, the subject matter of example 96, may further include: calculating the cost value based on the predicted maneuver using a parameter based on a predicted amount of the road users. In example 98, the subject matter of example 97, may further include: can optionally include that the predicted maneuver includes occupying at least a portion of the road environment; determining the predicted amount of the road users based on a frequency of cars that have passed the vehicle, and the average velocity determined for the portion of the road environment. In example 99, the subject matter of any one of examples 96 to 98, may further include: calculating the cost value based on the predicted maneuver using a parameter based on a speed difference between the predicted speed of the vehicle and the average velocity determined for the portion of the road environment.

In example 100, the subject matter of any one of examples 96 to 99, may further include: calculating the cost value based on the predicted maneuver using a parameter based on a predicted duration for the predicted maneuver and a predicted period of time based on the arrival of a first road user behind the vehicle. In example 101, the subject matter of any one of examples 69 to 100, may further include: predicting the cost value for the predetermined route based on the environment information and adjust the predetermined route based on the predicted cost value. In example 102, the subject matter of any one of examples 69 to 101, may further include: determining to perform the predicted movement of the vehicle, in case the vehicle is not a leading vehicle of the road users. In example 103, the subject matter of any one of examples 69 to 102, may further include: identifying at least one road user of the road users that are predicted to leave the road environment, and prioritize the anticipated movement of the at least one road user of the road users based on road users of the road users that are predicted to stay in the road environment.

In example 104, the subject matter of example 103, may further include: identifying the at least one road user of the road users that are predicted to leave the road environment based on the environment information. In example 105, the subject matter of any one of examples 60 to 104, may further include: providing an indication of a presence of a vulnerable road user for at least one road user of the road users based on the environment information. In example 106, the subject matter of any one of examples 60 to 105, may further include: detecting a vulnerable road user preventing the predicted movement of the vehicle. In example 107, the subject matter of example 106, may further include: providing an indication for the predicted movement that is prevented by the vulnerable road user to at least one road user of the road users based on the anticipated movement of the at least one road user of the road users. In example 108, the subject matter of any one of examples 60 to 107, may further include: providing an indication of the determined action to the vehicle.

In example 109, the subject matter of any one of examples 60 to 108, may further include: generating at least a first portion of the environment information based on received sensor data and store the at least the first portion of the environment information in the memory. In example 110, the subject matter of any one of examples 108 or 109 may further include: generating at least a second portion of the environment information based on the received traffic data and store the at least the second portion of environment information in the memory. In example 111, the subject matter of example 110, may further include: receiving vehicle-to-everything (V2X) messages including the traffic data. In example 112, the subject matter of example any one of examples 110 or 111, may further include: encoding a message indicating the determined action to be transmitted by a communication interface. In example 113, the subject matter of example any one of examples 110 to 112, may further include: encoding a message indicating a determination of prioritizing the anticipated movement of the at least one road user of the road users to be transmitted by the communication interface. In example 114, the subject matter of example any one of examples 60 to 114, can optionally include that the road users includes a line of vehicles. In example 115, the subject matter of example any one of examples 60 to 115, can optionally include that the determined action enforces the vehicle to deviate from the predetermined route or stop.

In example 116, a non-transitory computer-readable medium may include instructions which, if executed by a processor, cause the processor to perform any of the methods according to any one of examples 60 to 115.

In example 117, a device may include: a means for accessing environment information may include an indication of a size of the road users intersecting with a predetermined route of a vehicle in a road environment; a means for prioritizing an anticipated movement of at least one road user of the road users over a predicted movement of the vehicle within the predetermined route based on the size of the road users; a means for determining a vehicle action allowing the anticipated movement of the at least one road user of the road users.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may be configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, Zig-Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device comprising a processor configured to:
   access environment information comprising an indication of a size of road users intersecting with a predetermined route of a vehicle in a road environment;
   prioritize an anticipated movement of at least one road user over a predicted movement of the vehicle within the predetermined route based on the size of road users, wherein the prioritization of the anticipated movement comprises calculating a cost value for the road users based on the size of the road users using a predefined cost function, and wherein parameters of the cost function are configured to affect the calculated cost value based on a first sigmoid function for a first parameter of the parameters and a second sigmoid function for a second parameter of the parameters;
   determine a vehicle action allowing the anticipated movement of the at least one road user by modifying the predetermined route to a modified route; and
   transmit a control signal to a mobility system of the vehicle to control the vehicle according to the modified route.

2. The device of claim 1,
   wherein the indication of the size of road users comprises at least one of a number of road users, a space occupied by the road users, or a length of a line for the road users.

3. The device of claim 2,
   wherein the processor is further configured to prioritize the anticipated movement of the at least one road user based on the environment information.

4. The device of claim 3,
   wherein the environment information further comprises information indicating at least one of road user types of at least one road user, speed of at least one road user, predicted intent of at least one road user, or position of at least one road user.

5. The device of claim 4,
   wherein the environment information further comprises information indicating at least one of a size of road users behind the vehicle, a length of road users ahead of the vehicle, a size of road users in a proximity to the vehicle, a size of road users in a detectable proximity to the vehicle, a speed related to the road environment, a duration for at least one road user to stay behind the vehicle, a duration for at least one road user to stay ahead of the vehicle, a predicted behavior related to at least one road user, or a map data including the road environment.

6. The device of claim 1,
   wherein the processor is further configured to prioritize the anticipated movement of the at least one road user based on the cost value according to a predefined social force model.

7. The device of claim 6,
   wherein the cost function further comprises at least one parameter based on at least one of the following: an amount of road users behind the vehicle, an amount of road users ahead of the vehicle, an amount or size of road users in the road environment, a speed of the vehicle, a speed related to the road environment, a duration for at least one road user to stay behind the vehicle, a duration for at least one road user to stay ahead of the vehicle, types of the vehicles of road users, a predicted behavior related to at least one road user, or a map data.

8. The device of claim 7,
   wherein the first sigmoid function is configured to affect the calculated cost value based on a first weight parameter and the second sigmoid function affects the calculated cost value based on a second weight parameter.

9. The device of claim 8,
   wherein the processor is further configured to determine a risk parameter for at least one road user based on at least one of the size of road users, a shape of the road environment, a type of the at least one road user, or a predicted behavior of the at least one road user;
   wherein the processor is further configured to prioritize the anticipated movement of the at least one road user based on the risk parameter.

10. The device of claim 7,
    wherein the processor is further configured to calculate a first cost value for a first crowd of road users and a second cost value for a second crowd of road users;
    wherein the processor is further configured to prioritize the anticipated movement of the at least one road user based on the first cost value and the second cost value.

11. The device of claim 7,
    wherein the processor is further configured to identify a plurality of stop or turnout locations based on the map data and compare costs of each identified location based on the cost function.

12. The device of claim 1,
    wherein the processor is further configured to determine to perform a maneuver by the vehicle facilitating the anticipated movement of the at least one road user.

13. The device of claim 1,
    wherein the processor is further configured to identify a location based on a map data and determine to stop or slow down the vehicle at the location.

14. The device of claim 1, further comprising:
    a communication interface to receive environment data;
    wherein the processor is configured to encode a message indicating the determined action to be transmitted by the communication interface.

15. A non-transitory computer-readable medium comprising instructions which, if executed by a processor, cause the processor to:

access environment information comprising an indication of a size of road users intersecting with a predetermined route of a vehicle in a road environment;

prioritize an anticipated movement of at least one road user over a predicted movement of the vehicle within the predetermined route based on the size of road users, wherein the prioritization of the anticipated movement comprises calculating a cost value for the road users based on the size of the road users using a predefined cost function, and wherein parameters of the cost function are configured to affect the calculated cost value based on a first sigmoid function for a first parameter of the parameters and a second sigmoid function for a second parameter of the parameters;

determine a vehicle action allowing the anticipated movement of the at least one road user by modifying the predetermined route of the vehicle to a modified route; and transmit a control signal to a mobility system of the vehicle to control the vehicle according to the modified route.

16. The non-transitory computer-readable medium of claim 15, wherein the instructions further cause the processor to calculate the cost value for the road users of a crowd of road users based on an amount of the crowd of road users to prioritize the anticipated movement of the at least one road user of the crowd of road users.

17. A device comprising:

a means for accessing environment information comprising an indication of a size of road users intersecting with a predetermined route of a vehicle in a road environment;

a means for prioritizing an anticipated movement of at least one road user over a predicted movement of the vehicle within the predetermined route based on the size of road users, wherein the prioritization of the anticipated movement comprises calculating a cost value for the road users based on the size of the road users using a predefined cost function, and wherein parameters of the cost function are configured to affect the calculated cost value based on a first sigmoid function for a first parameter of the parameters and a second sigmoid function for a second parameter of the parameters;

a means for determining a vehicle action allowing the anticipated movement of the at least one road user by modifying the predetermined route of the vehicle to a modified route; and a means for transmitting a control signal to a mobility system of the vehicle to control the vehicle according to the modified route.

18. The device of claim 17, wherein the indication of the size of road users comprises at least one of a number of road users, a space occupied by the road users, or a length of a line for the road users.

* * * * *